(12) United States Patent  
Nakagawa et al.

(10) Patent No.: US 8,778,183 B2  
(45) Date of Patent: Jul. 15, 2014

(54) FILTERING APPARATUS

(75) Inventors: Koichi Nakagawa, Komatsushinna (JP); Yoshifumi Kusaka, Tokushima (JP); Daisuke Nii, Yoshinogawa (JP); Daisuke Fujieda, Tokushima (JP)

(73) Assignee: AWA Paper Mfg. Co., Ltd., Tokushima (JP)

( * ) Notice: Subject to any disclaimer, the term of this patent is extended or adjusted under 35 U.S.C. 154(b) by 220 days.

(21) Appl. No.: 12/921,196

(22) PCT Filed: Jan. 26, 2010

(86) PCT No.: PCT/JP2010/050991  
§ 371 (c)(1),  
(2), (4) Date: Sep. 7, 2010

(87) PCT Pub. No.: WO2011/092804  
PCT Pub. Date: Aug. 4, 2011

(65) Prior Publication Data  
US 2012/0067809 A1    Mar. 22, 2012

(51) Int. Cl.  
*B01D 35/30* (2006.01)  
*B01D 29/00* (2006.01)  
*B01D 25/00* (2006.01)  
*B01D 65/00* (2006.01)  
*B01D 29/52* (2006.01)  
*B01D 63/08* (2006.01)  
*B01D 29/39* (2006.01)  
*C02F 1/00* (2006.01)

(52) U.S. Cl.  
CPC .............. *B01D 29/39* (2013.01); *B01D 65/003* (2013.01); *B01D 29/52* (2013.01); *B01D 2313/06* (2013.01); *B01D 63/084* (2013.01); *B01D 65/00* (2013.01); *B01D 2313/12* (2013.01); *B01D 2315/06* (2013.01); *B01D 63/081* (2013.01)

USPC ........... 210/346; 210/232; 210/252; 210/258; 210/323.1; 210/455; 210/172.1

(58) Field of Classification Search  
None  
See application file for complete search history.

(56) References Cited

U.S. PATENT DOCUMENTS 4,556,488 A * 12/1985 Timm et al. .............. 210/321.84  
6,524,478 B1 * 2/2003 Heine et al. .............. 210/321.75  
(Continued)

FOREIGN PATENT DOCUMENTS

DE          174 368        10/1904  
DE        197 17 099      11/1997  
(Continued)

OTHER PUBLICATIONS

International Search Report issued May 25, 2010 in International (PCT) Application No. PCT/JP2010/50991.

(Continued)

*Primary Examiner* — Benjamin Kurtz  
(74) *Attorney, Agent, or Firm* — Wenderoth, Lind & Ponack, LLP

(57) ABSTRACT

A filtering apparatus that sucks liquid in hollow portions (10) of the filtering elements (1) via suction pipes (3) so that liquid passes the filtering elements and is filtered. Each suction pipe has suction holes (4) connected to the hollow portions. The suction pipes are inserted into through holes (2) of the filtering elements. The filtering elements are arranged side by side and connected to the suction pipes. A ring-shaped packing is interposed between the filtering elements, and water-tightly seals the clearance between the filtering element and the suction pipe. The through holes are arranged at peripheral locations of each filtering element. The suction pipes are inserted into the through holes of each filtering element. The filtering elements are held at the peripheral locations by the suction pipes.

17 Claims, 24 Drawing Sheets

(56) References Cited

U.S. PATENT DOCUMENTS

2005/0126966 A1 6/2005 Tanida et al.
2006/0086654 A1* 4/2006 Voigt et al. .................. 210/321.6
2007/0114171 A1* 5/2007 Chen et al. .................... 210/489

FOREIGN PATENT DOCUMENTS

| JP | 26-10294 | 9/1951 |
| JP | 31-9095 | 10/1956 |
| JP | 35-779 | 1/1960 |
| JP | 47-14480 | 5/1972 |
| JP | 4-26089 | 3/1992 |
| JP | 6-41810 | 6/1994 |
| JP | 8-39061 | 2/1996 |
| JP | 2004-202480 | 7/2004 |
| JP | 2010-29818 | 2/2010 |
| WO | 2006/045440 | 5/2006 |

OTHER PUBLICATIONS

Extended European Search Report issued Jun. 7, 2013 in corresponding European patent application No. 10 76 8850.

* cited by examiner

PRIOR ART

FILTERING APPARATUS

BACKGROUND OF THE INVENTION

1. Technical Field

The present invention relates to a filtering apparatus that includes a plurality of sheet-shaped hollow filtering elements arranged side by side to increase the filtering area of the filtering apparatus.

2. Description of the Related Art

A filtering apparatus has been developed that draws fluid in by suction so that the fluid passes a plurality of sheet-shaped hollow filtering elements through suction pipes. The filtering elements are arranged side by side and connected to each other by the suction pipes that are inserted into the filtering elements via through holes disposed in the filtering elements (see WO2006/045440).

SUMMARY OF THE INVENTION

1. Problems to be Solved by the Invention

As shown in FIGS. 1 and 2, the filtering apparatus disclosed in WO2006/045440 includes a plurality of sheet-shaped hollow filtering elements 91 that are arranged side by side and connected to each other by two suction pipes 93. The two suction pipes 93 are inserted into each side surface at parts on the center line of each filtering element 91. FIG. 3 is a cross-sectional view showing portions of the filtering elements 91 that are inserted into the suction pipes 93. The suction pipes 93 are connected to central portions 91A arranged inside the filtering elements 91, and suck liquid into the central portions 91A and suck out the liquid from the central portions 91A. Each suction pipe 93 is composed of a plurality of connection pipes 94. A smaller diameter portion 94A and a stepped portion 94B are formed on each end of the connection pipe 94. The smaller diameter portion 94A is inserted into the through hole 92 of the filtering element 91. The stepped portion 94B is brought into intimate contact with the outer peripheral surface of the through hole 92 of the filtering element 91. Thus, liquid can be sucked into and out from the filtering elements 91 to permeate the filtering elements 91. In the thus-configured filtering apparatus, since a plurality of connection pipes 94 are interposed between the filtering elements 91 to compose the suction pipe 93, the suction pipe 93 is composed of separated pipes between the filtering elements 91. The thus-configured filtering apparatus has a disadvantage in that this apparatus is assembled at significant expense and time and effort. In particular, since the stepped portions 94B of a number of separated connection pipes 94 are required to be brought in intimate contact with the surfaces of the filtering elements 91 for providing a water tight structure, the thus-configured filtering apparatus has a disadvantage in that this apparatus is assembled to provide a complete water tight structure which requires significant time and effort. The reason is that the connection pipes 94 are required to be arranged between a number of filtering elements 91 arranged side by side when assembled.

In addition, in the filtering apparatuses shown in FIGS. 1 and 2, in order to space the filtering elements 91 away from each other at a constant interval, a structure is required that couples the four-corners of each filtering element 91 to a frame 95. In the filtering apparatus shown in FIG. 1, strings 97 are coupled to the four corners of each hollow filtering element 91, and are coupled to rods 96 that are arranged outward of the four corners of each hollow filtering element 91. In this structure, since the strings 97 are coupled to the four corners of each filtering element 91 and to the rods 96, there is a disadvantage in that the filtering elements 91 are assembled at much expense in time and effort to space the filtering elements at a constant interval.

Also, in the filtering apparatus shown in FIG. 2, the rods 96 are inserted into the four corners of filtering elements 91. In this filtering apparatus, if the filtering elements 91 move along the rods 96, the filtering elements 91 cannot be spaced at a constant interval. For this reason, it is necessary to couple the filtering elements 91 to the rods 96 immovably in the axial direction of the rods 96. Accordingly, also in the case of this structure, the filtering elements 91 are assembled at much expense in time and effort.

The present invention has been developed for solving the aforementioned disadvantages. It is an important object of the invention to provide a filtering apparatus including suction pipes that have a simple structure of continuous pipe and which can be simply, easily and efficiently assembled, because the sheet-shaped hollow filtering elements can be spaced at a constant interval from each other, and the sheet-shaped hollow filtering elements can be water-tightly connected to the suction pipes in ideal conditions.

2. Means for Solving the Problems and Effects of the invention

A filtering apparatus according to the present invention includes a plurality of sheet-shaped hollow filtering elements 1, and suction pipes 3. Each of the plurality of sheet-shaped hollow filtering elements 1 includes two sheets of laminated filtering materials 11. The outer peripheral edge parts of the filtering materials 11 are bonded to each other. The suction pipes 3 penetrate the plurality of sheet-shaped hollow filtering elements 1 to be connected to hollow portions 10 of the sheet-shaped hollow filtering elements 1. In this filtering apparatus, liquid passes the hollow portion 10 inside the sheet-shaped hollow filtering element 1 from the outside of the sheet-shaped hollow filtering element 1, and moves from the hollow portion 10 of the sheet-shaped hollow filtering element 1 to the suction pipes 3 so that the liquid is filtered. Each of the suction pipes 3 has suction holes 4 to be connected to the hollow portions 10 of the sheet-shaped hollow filtering elements 1. The sheet-shaped hollow filtering elements 1 have through holes 2 that receive the suction pipes 3. The suction pipes 3 are inserted into the through holes 2 so that the plurality of sheet-shaped hollow filtering elements 1 are arranged side by side and are connected to the suction pipes 3. Ring-shaped packing members 5 are interposed between the sheet-shaped hollow filtering elements 1 that receive the suction pipe 3 and are arranged side by side to water-tightly seal the clearance between the sheet-shaped hollow filtering element 1 and the suction pipe 3. Each of the ring-shaped packing members 5 has an outer shape that is larger than the inner shape of the through hole 2 of the sheet-shaped hollow filtering element 1. The through holes 2 are arranged at a plurality of locations along the outer peripheral part of each of the sheet-shaped hollow filtering elements 1. The suction pipes 3 are inserted into the through holes 2 of each of the sheet-shaped hollow filtering elements 1 so that each of the plurality of sheet-shaped hollow filtering elements 1 are held at the plurality of outer peripheral locations to the suction pipes 3.

The thus-configured filtering apparatus has features in that suction pipes have a simple structure of continuous pipe but the filtering apparatus can be simply, easily and efficiently assembled. The sheet-shaped hollow filtering elements, which are adjacent to each other, can be spaced at a constant interval from each other, and the sheet-shaped hollow filtering elements can be water-tightly connected to the suction pipes in ideal conditions. In particular, in this filtering apparatus, the through holes are arranged at a plurality of locations along the outer peripheral part of each of the sheet-shaped hollow filtering elements, and the suction pipes are inserted into the through holes so that the plurality of sheet-shaped hollow filtering elements are spaced at a constant interval away from each other. Dissimilar to conventional filtering apparatuses, this filtering apparatus does not require a special structure for holding the outer peripheries of the sheet-shaped hollow filtering elements. In this filtering apparatus, the suction pipes serve not only to suck liquid into and suck the liquid out from the sheet-shaped hollow filtering elements, but also to hold the sheet-shaped hollow filtering elements. Accordingly, this filtering apparatus does not require a separate structure for holding the sheet-shaped hollow filtering elements side by side, but can hold the plurality of sheet-shaped hollow filtering elements at constant intervals away from each other.

In addition, the thus-configured filtering apparatus has features in that the suction pipes have a simple structure, the sheet-shaped hollow filtering elements can be simply, easily and efficiently assembled, and the sheet-shaped hollow filtering elements can be water-tightly connected to the suction pipe in ideal conditions. In particular, in the filtering apparatus according to the present invention, suction holes open externally of the suction pipes, and can be water-tightly sealed between the adjacent sheet-shaped hollow filtering elements by ring-shaped packing members that are interposed between the sheet-shaped hollow filtering elements. In this configuration, since the suction pipes are inserted into the sheet-shaped hollow filtering elements and the ring-shaped packing members so that the hollow filtering elements are alternately arranged side by side whereby interposing both side surfaces of the sheet-shaped hollow filtering element between the ring-shaped packing members, the hollow portions of the sheet-shaped hollow filtering elements are connected to the suction pipes via the suction holes, and in addition the suction holes can be water-tightly sealed between the adjacent sheet-shaped hollow filtering elements by the ring-shaped packing member. Accordingly, even in the case where the sheet-shaped hollow filtering elements are arranged side by side at deviated positions in the axial direction of the suction pipes when the suction pipes are inserted into the sheet-shaped hollow filtering elements, all the sheet-shaped hollow filtering elements can be water-tightly connected to the suction pipes, and the openings of the suction pipes can be water-tightly sealed between the sheet-shaped hollow filtering elements by the ring-shaped packing members.

In the filtering apparatus according to the present invention, the shortest distance (A) between the inner peripheral rim of the through hole 2 and the outer peripheral rim of the sheet-shaped hollow filtering element 1 can be not more than 20% of the minimum width (W) of the sheet-shaped hollow filtering element 1, and can be not more than 40 mm.

In the thus-configured filtering apparatus, since the suction pipes are inserted into the through holes located along the outer peripheral part of each of the sheet-shaped hollow filtering elements, the sheet-shaped hollow filtering elements can be held by a plurality of suction pipes in ideal conditions.

In the filtering apparatus according to the present invention, the sheet-shaped hollow filtering element 1 can have a quadrangular shape, and the through holes 2 can be arranged at the four corners of the sheet-shaped hollow filtering element 1.

The thus-configured filtering apparatus has a simple structure but allows a plurality of sheet-shaped hollow filtering elements to be arranged side by side and spaced at constant intervals away from each other.

In the filtering apparatus according to the present invention, the sheet-shaped hollow filtering element 1 can have a rectangular shape, and three or more of the through holes 2 can be arranged along a longer edge of the sheet-shaped hollow filtering element 1.

In the thus-configured filtering apparatus, the area of the sheet-shaped hollow filtering element can be large, and a plurality of sheet-shaped hollow filtering elements can be arranged side by side and spaced at constant intervals away from each other.

In the filtering apparatus according to the present invention, the suction holes 4 of the suction pipe 3 are slit-shaped through holes extending in the axial direction of the suction pipe 3.

In the thus-configured filtering apparatus, the suction hole is not required to be formed at a position on the suction pipe that agrees with the sheet-shaped hollow filtering element. Since the opening of the suction hole has an elongated slit shape, the suction pipe can be connected to various types of sheet-shaped hollow filtering elements via the suction hole.

In the filtering apparatus according to the present invention, the suction pipe 3 can include a perforated cylindrical member 46 that is laminated on the outer peripheral surface of the suction pipe 3. In addition, the suction pipe 3 with the laminated perforated cylindrical member 46 can be inserted into the through holes 2 of the sheet-shaped hollow filtering elements 1 so that the suction holes 4 arranged on the suction pipe 3 are connected to the hollow portions 10 of the sheet-shaped hollow filtering elements 1 via the perforated cylindrical member 46.

In the thus-configured filtering apparatus, since the hollow portion of the sheet-shaped hollow filtering element is connected to the suction holes of the suction pipe via the perforated cylindrical member laminated on the outer peripheral surface of the suction pipe, liquid can be efficiently sucked into the sheet-shaped hollow filtering element via a large area of the inner peripheral surface of the through hole arranged on the sheet-shaped hollow filtering element so that liquid passes the hollow portion of the sheet-shaped hollow filtering element and moves into the suction pipe. In addition, in the thus-configured filtering apparatus, it is not necessary to form a plurality of suction holes at positions on the suction pipe that agree with the sheet-shaped hollow filtering elements, and the number of the suction holes can be reduced to be formed on the suction pipe. Accordingly, the suction pipe, which is subjected to simple machining, can suck liquid that passes the hollow portions of the sheet-shaped hollow filtering elements.

In the filtering apparatus according to the present invention, the outer peripheral edge parts of the two sheets of laminated filtering materials 11 with a predetermined width are bonded to each other by melting or adhesion so that the hollow portion 10 is formed in the sheet-shaped hollow filtering element 1, and non-bonded portions 1B are formed along the outer peripheral edges of the two sheets of filtering materials 11. In addition, the outer peripheral edges of the two sheets of filtering materials 11 are not bonded to each other by melting or adhesion in the non-bonded portions 1B.

In the thus-configured filtering apparatus, since non-bonded portions are formed along the outer peripheral edges of the sheet-shaped hollow filtering elements, it is possible to prevent hardening of the outer peripheral edges of the sheet-shaped hollow filtering elements due to melting or adhesion.

Therefore, it is possible to effectively prevent damage starting from the outer peripheral edges of the sheet-shaped hollow filtering elements.

In the filtering apparatus according to the present invention, the sheet-shaped hollow filtering element 1 can include a mesh material 12 that is interposed between the two sheets of filtering materials 11 to form the hollow portion 10 inside the sheet-shaped hollow filtering element 1.

In the thus-configured filtering apparatus, although the sheet-shaped hollow filtering element can be thin, the hollow portion can be provided inside the sheet-shaped hollow filtering element.

In the filtering apparatus according to the present invention, an attachment member 26 can be coupled to one end or to each of the ends of the suction pipe 3 so that the sheet-shaped hollow filtering elements 1 are held by the attachment member 26 in a side by side arrangement.

In the thus-configured filtering apparatus, since the sheet-shaped hollow filtering elements to be arranged side by side are held by an attachment member coupled to one end or both ends of the suction pipe, the structure of the filtering apparatus can be simple but the suction holes of the suction pipe can be water-tightly sealed by the ring-shaped packing members between the sheet-shaped hollow filtering elements.

DETAILED DESCRIPTION OF THE INVENTION

Figure 1:
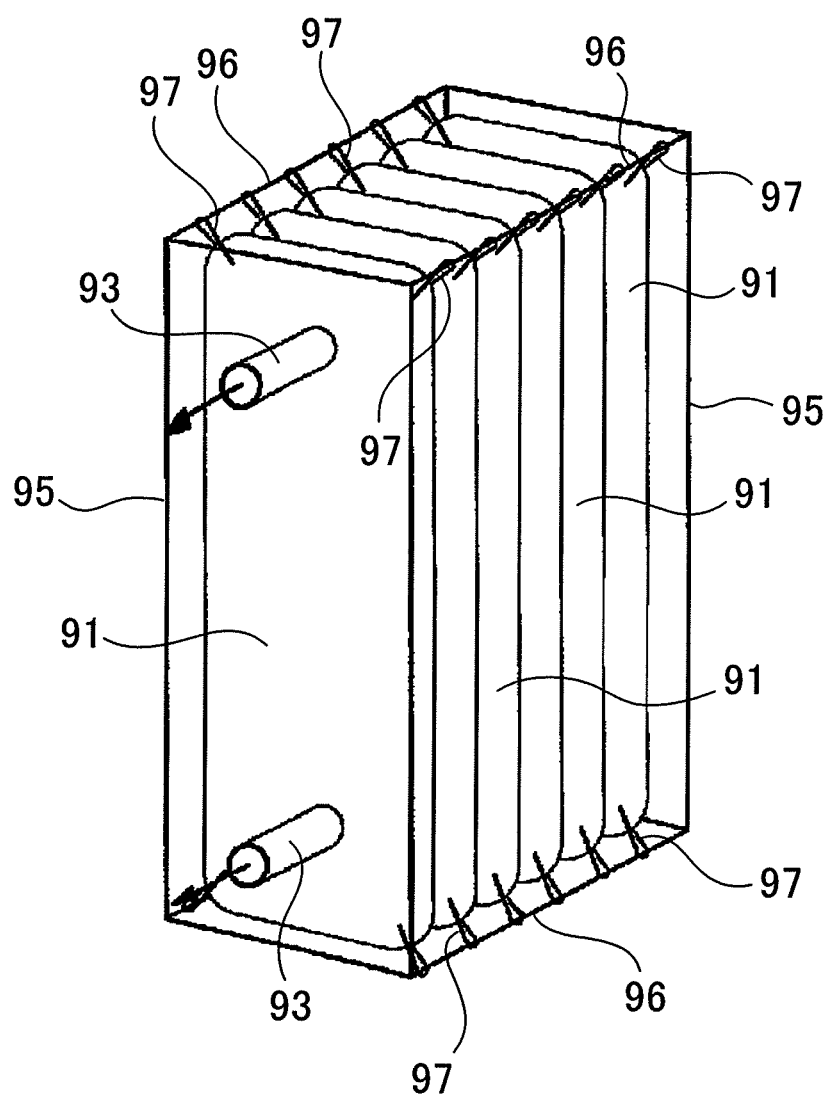
FIG. 1 is a perspective view schematically showing a known filtering apparatus.
Figure 2:
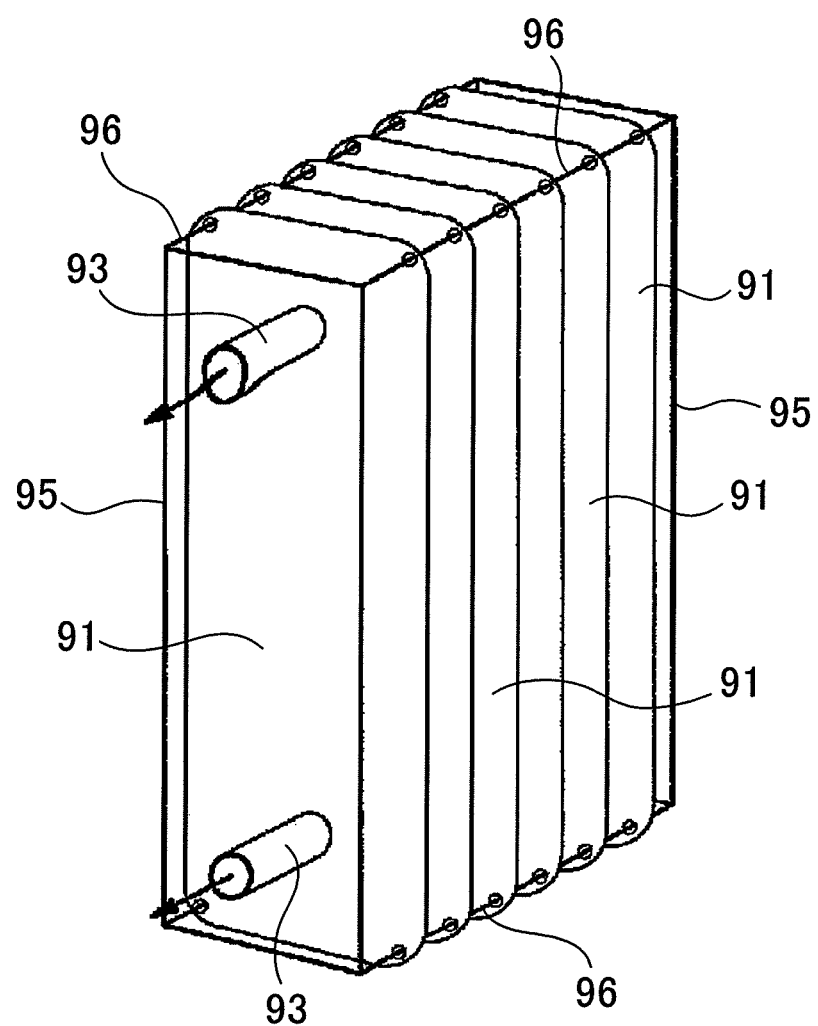
FIG. 2 is a perspective view schematically showing another known filtering apparatus.
Figure 3:
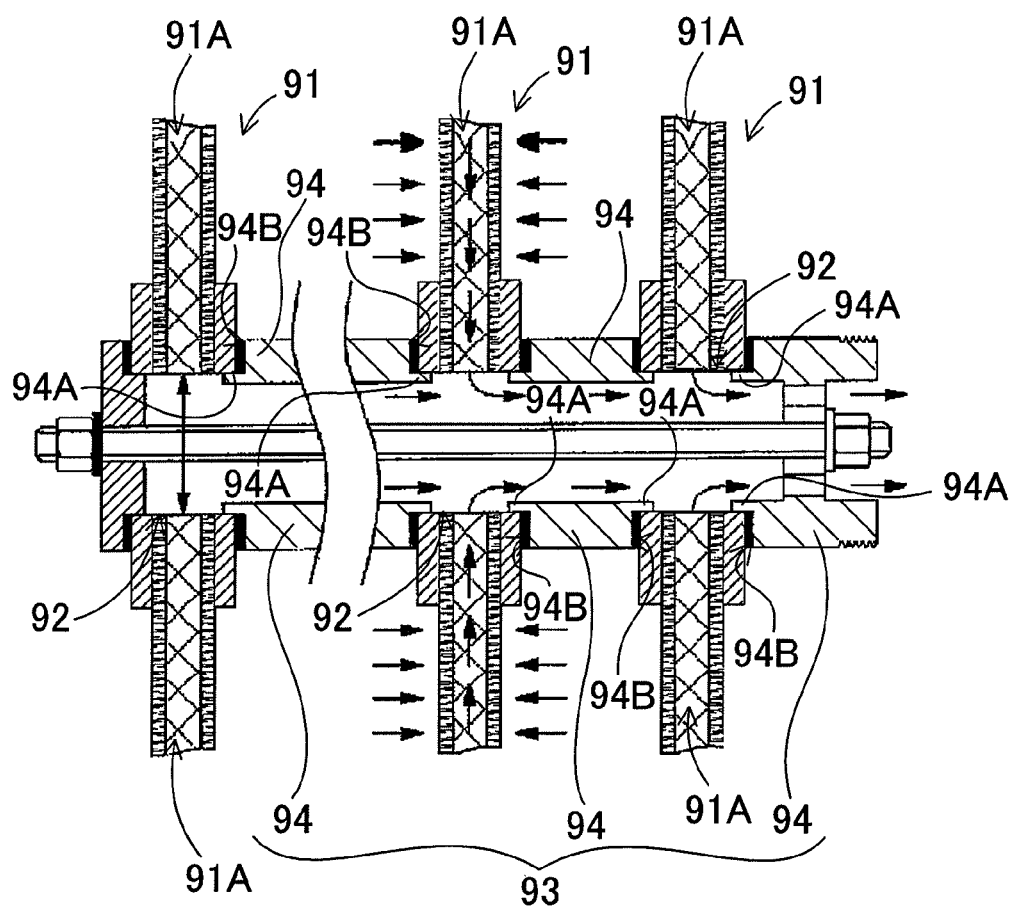
FIG. 3 is an enlarged cross-sectional view showing the filtering apparatus shown in FIG. 1 in use.

The following description will describe embodiments according to the present invention with reference to the drawings. It should be appreciated, however, that the embodiments described below are illustrations of a filtering apparatus to give a concrete form to technical ideas of the invention, and a filtering apparatus of the invention is not specifically limited to description below.

In this specification, reference numerals corresponding to components illustrated in the embodiments are added in "Means for Solving the Problem" to aid understanding of claims. However, it should be appreciated that the claims attached hereto are not specifically limited to members shown in the illustrated embodiments.

Figure 4:
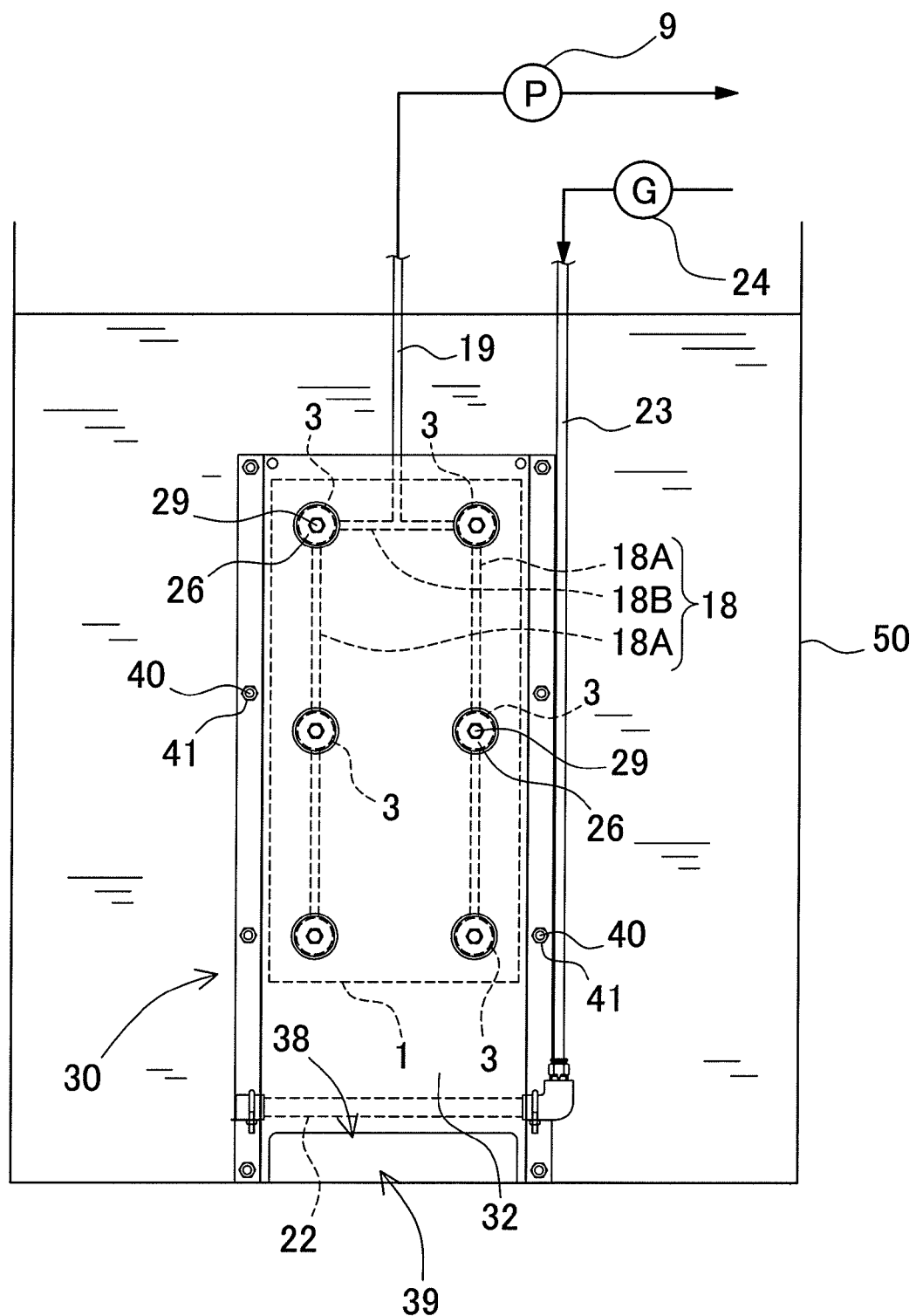
FIG. 4 is a cross-sectional view schematically showing a filtering apparatus according to a first embodiment of the present invention in use.
Figure 5:
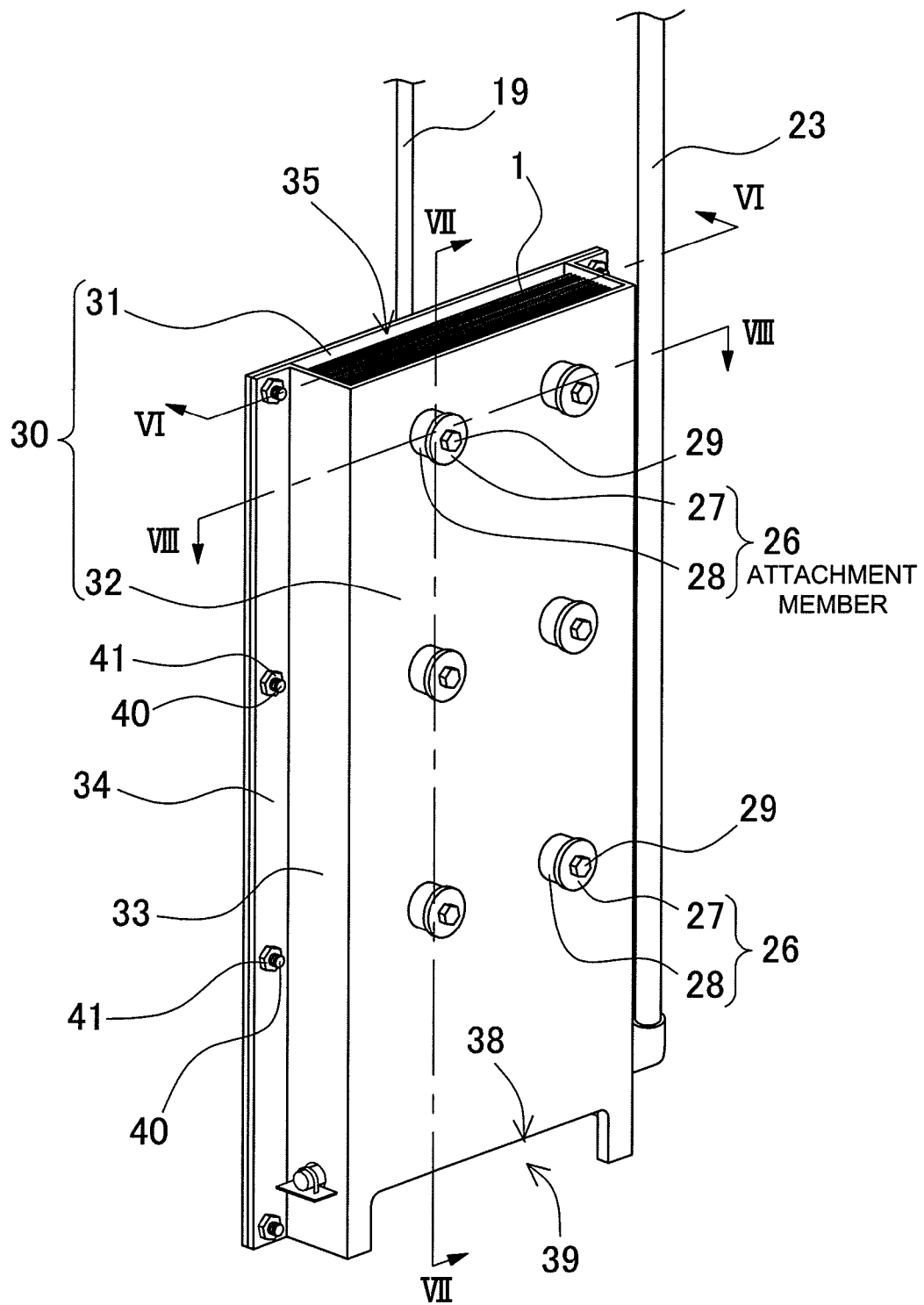
FIG. 5 is a perspective view showing the filtering apparatus according to the first embodiment of the present invention.
Figure 6:
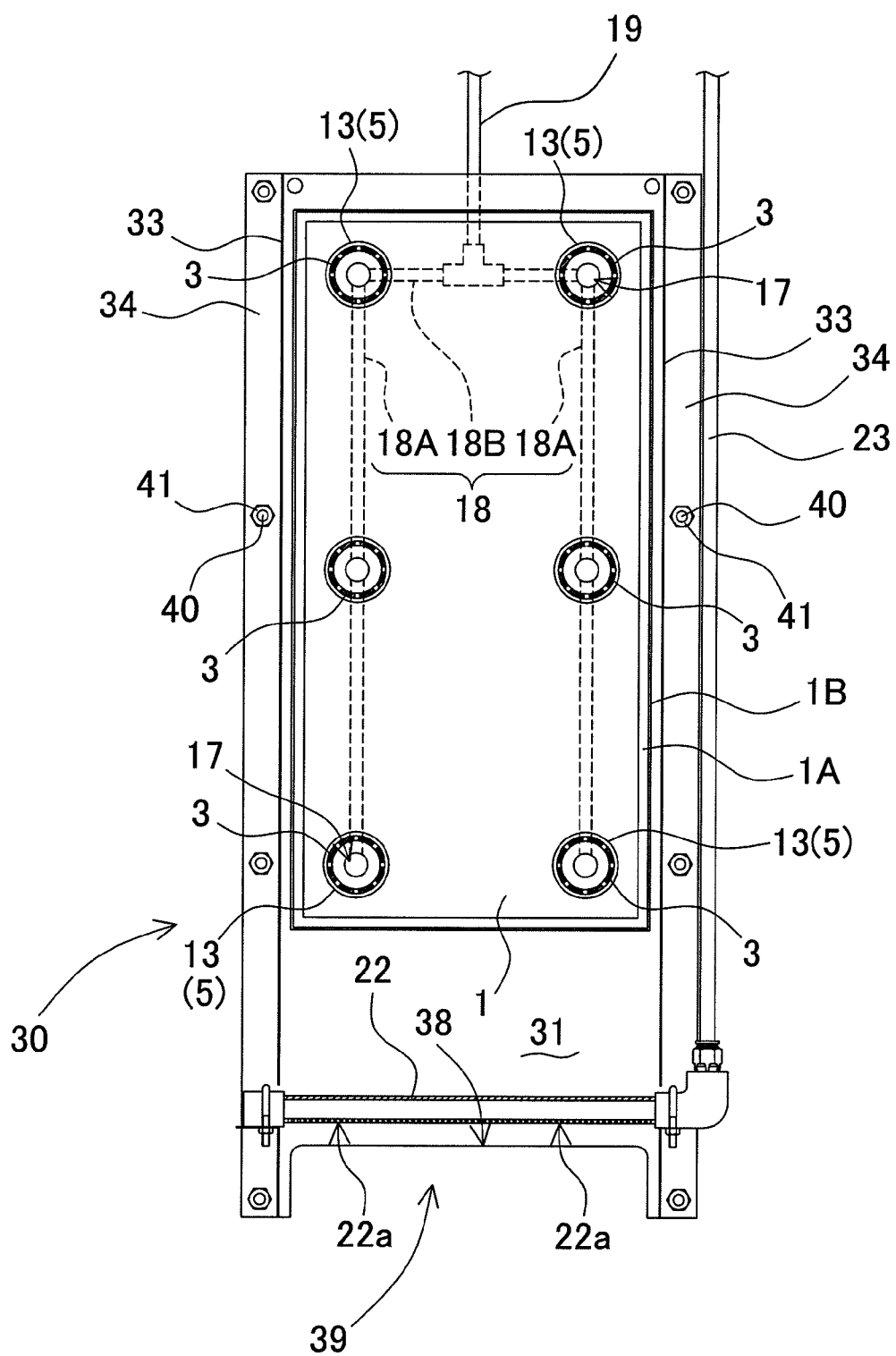
FIG. 6 is a cross-sectional view showing the filtering apparatus taken along a line VI-VI shown in FIG. 5.

FIG. 4 shows a filtering apparatus according to the present invention in use. As shown, the filtering apparatus according to the present invention is immersed in a purification tank or a tank 50 that accommodates turbid water. The filtering apparatus is suitable for filtering liquid such as water by sucking filtered clear water whereby discharging the clear water. In particular, the filtering apparatus according to the present invention is immersed in turbid water, e.g., in a purification tank. The filtering apparatus is suitable for discharging clear water without turbidity.

The filtering apparatus shown in FIGS. 4 to 10 includes a plurality of sheet-shaped hollow filtering elements 1, and suction pipes 3. Each of the sheet-shaped hollow filtering elements 1 includes two sheets of laminated filtering materials 11. The outer peripheral edge parts of the filtering materials 11 are bonded to each other. The suction pipes 3 penetrate the plurality of sheet-shaped hollow filtering elements 1 to be connected to hollow portions 10 of the sheet-shaped hollow filtering elements 1. The suction pipes 3 are connected to the suction side of a pump 9. The pump 9 sucks liquid into the suction pipes 3. Liquid sucked by the suction pipe 3 passes the sheet-shaped hollow filtering elements 1, and is filtered. That is, the pump 9 sucks air or liquid in the hollow portions 10 of the sheet-shaped hollow filtering elements 1 via the suction pipes 3 so that liquid passes the sheet-shaped hollow filtering elements 1 from the outside to the inside of the sheet-shaped hollow filtering elements 1 and is thus filtered.

Figure 10:
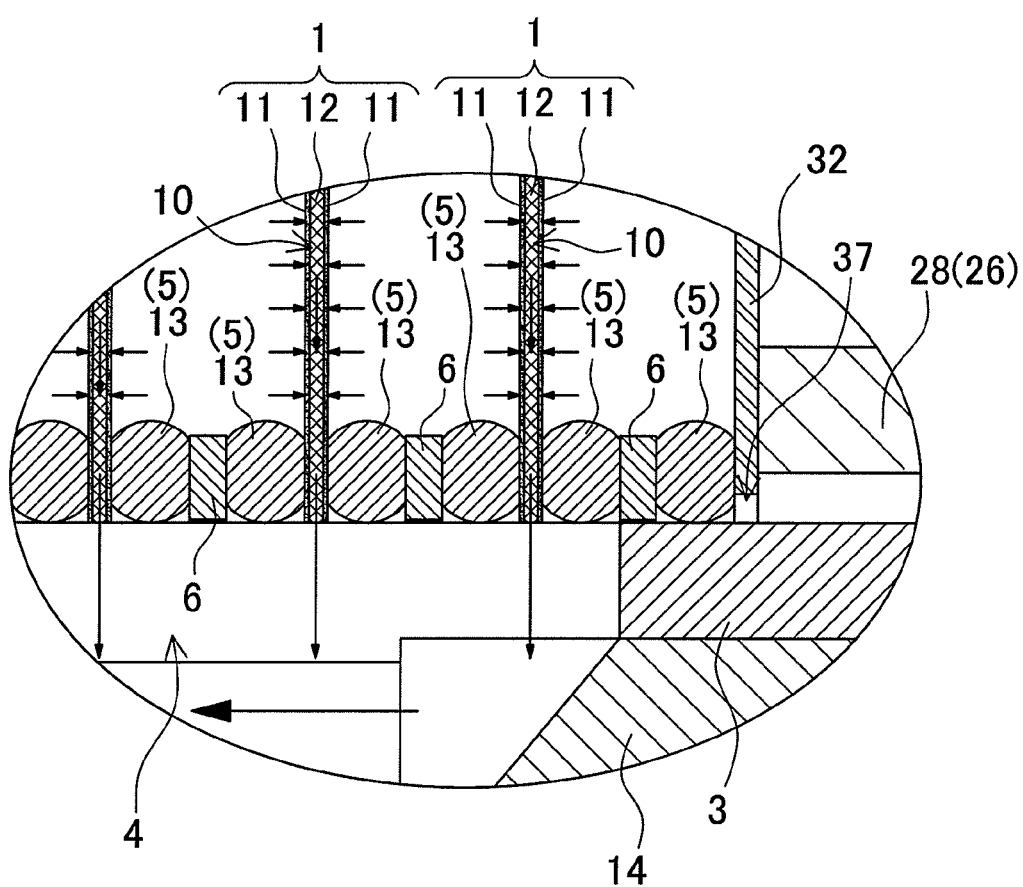
FIG. 10 is an enlarged cross-sectional view showing a principal part of the filtering apparatus shown in FIG. 9.
Figure 11:
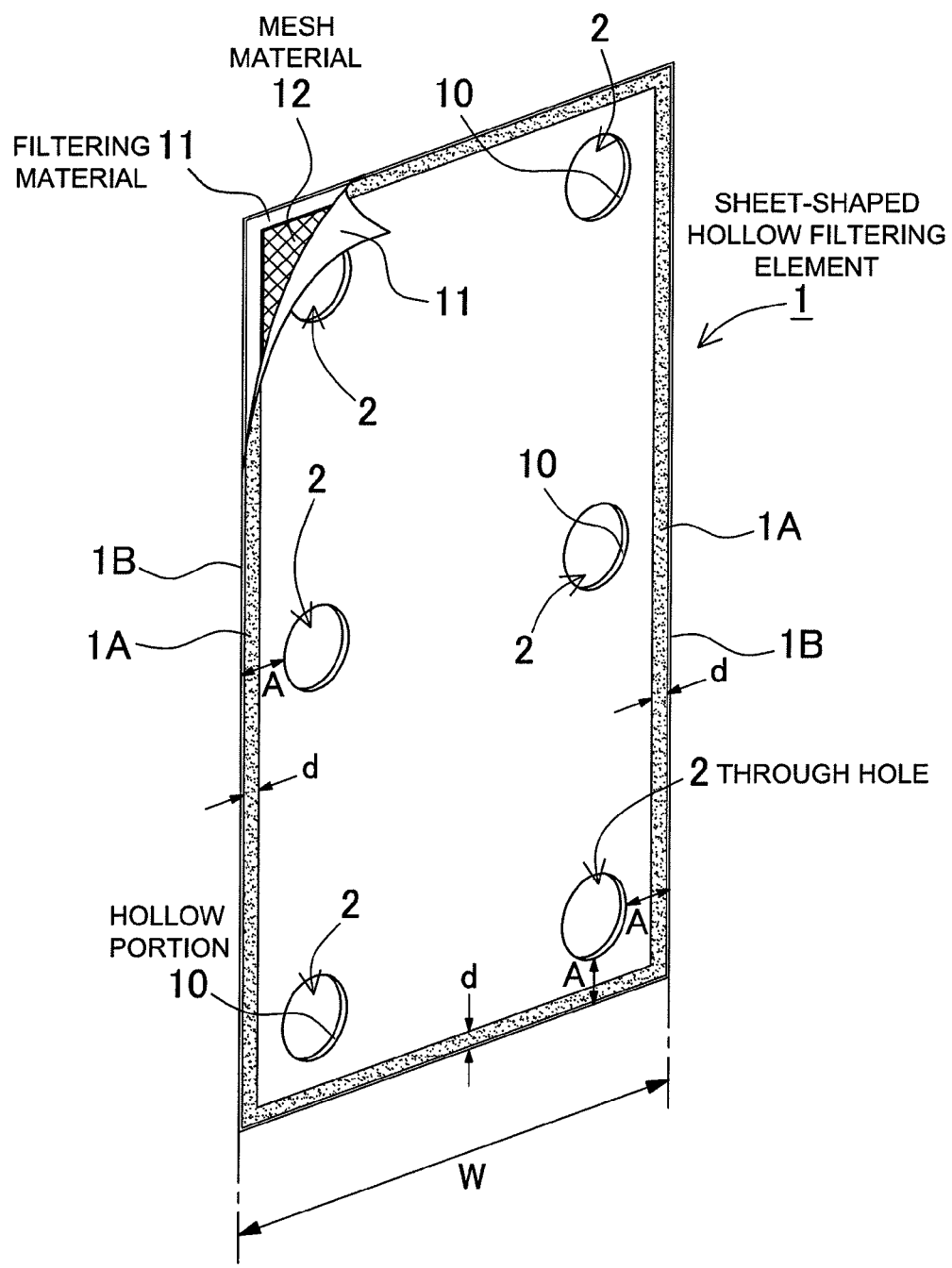
FIG. 11 is a perspective view showing the structure of a sheet-shaped hollow filtering element.

As shown in FIG. 10 of an enlarged cross-sectional view showing a principal part of the sheet-shaped hollow filtering element 1, and in FIG. 11 of a perspective view showing the sheet-shaped hollow filtering element 1, a mesh material 12 is interposed between the two sheets of filtering materials 11, and the outer peripheral edge parts of the filtering materials 11 are bonded to each other by heating and melting the outer peripheral edge parts of the filtering materials 11 or by joining the outer peripheral edge parts of the filtering materials 11 with an adhesive. Thus, the hollow portion 10 is formed inside the sheet-shaped hollow filtering element 1. In the sheet-shaped hollow filtering element 1 shown in FIGS. 11 and 12, bonded portions 1A are arranged along the outer peripheral edge parts of the two sheets of laminated filtering materials 11. The outer peripheral edge parts of the filtering materials 11 with a predetermined width (d) are bonded to each other by melting or adhesion. Thus, the hollow portion 10 is formed on the interior sides of the two sheets of filtering materials 11. In addition, non-bonded portions 1B are formed along the outer peripheral edges of the two sheets of filtering materials 11. The outer peripheral edges of the two sheets of filtering materials 11 are not bonded to each other by melting or adhesion in the non-bonded portions 1B. In this configuration, since non-bonded portions 1B are formed along the outer peripheral edges of the sheet-shaped hollow filtering elements 1, it is possible to effectively prevent the outer peripheral edges of the sheet-shaped hollow filtering elements 1 from being hardened by melting or adhesion, and thereby preventing damage starting at the outer peripheral edges. In the sheet-shaped hollow filtering element 1 shown in FIG. 12, the width (d) of the bonded portion 1A is 10 mm that is formed along the outer peripheral edges, and the width (t) of the non-bonded portion 1B is 1.5 mm. However, the width (d) of the non-bonded portion can fall within a range of 5 to 15 mm, and the width (t) of the non-bonded portion 1B can fall within a range of 1 to 5 mm.

The mesh material 12 is formed of wire rods that intersect each other in crisscross patterns. Thus, spatial parts are formed by the wire rods. In addition, an uneven surface is formed by the structure of wire rods that intersect each other. The uneven surfaces of mesh material 12 support the interior surface of the filtering materials 11. Thus, a gap is formed between the two sheets of filtering materials 11, that is, the hollow portion 10 is formed. In the thus-configured sheet-shaped hollow filtering element 1, the inner gap of the hollow portion 10 is defined by the thickness of the mesh material 12. The inner gap of the hollow portion 10, i.e., the thickness of the mesh material 12 is dimensioned to allow liquid to smoothly flow in the hollow portion 10 after passing the filtering materials 11 and being sucked into the hollow portion 10. For example, the inner gap of the hollow portion 10 can be 0.3 mm. However, the inner gap of the hollow portion can fall within a range of 0.1 to 5 mm, preferably 0.1 to 3 mm, and more preferably 0.2 to 1 mm, for example.

Although not illustrated, a plate with uneven surfaces can be interposed instead of the mesh material between the two sheets of filtering materials to form the hollow portion inside the sheet-shaped hollow filtering element. Also, a plurality of wire rods can be arranged in a grid pattern between the two sheets of filtering materials to form the hollow portion inside the sheet-shaped hollow filtering element. Also, the filtering materials may be formed in uneven sheets to form the hollow portion inside the sheet-shaped hollow filtering element. The structure for forming the hollow portion inside the sheet-shaped hollow filtering element according to the present invention is not limited to the structure for disposing the mesh material inside the sheet-shaped hollow filtering element.

The sheet-shaped hollow filtering element 1 has a plurality of through holes 2 that open to receive the suction pipes 3. The through holes 2 are arranged at a plurality of locations along the outer peripheral part of each of the sheet-shaped hollow filtering elements 1. The suction pipes 3 are inserted into the through holes 2 of each of the sheet-shaped hollow filtering elements 1. Thus, each of the plurality of sheet-shaped hollow filtering elements 1 is held at the plurality of outer peripheral locations to the suction pipes 3. The illustrated sheet-shaped hollow filtering element 1 has a rectangular shape as a whole. Six through holes 2 are arranged along the outer peripheral part of the sheet-shaped hollow filtering element 1. The sheet-shaped hollow filtering element 1 has through holes 2 at its four corners. Three through holes 2 are arranged along each longer edge of the sheet-shaped hollow filtering element 1. The sheet-shaped hollow filtering element 1 totally has six through holes 2 along the outer peripheral part of the sheet-shaped hollow filtering element 1. However, in the case where the sheet-shaped hollow filtering element has a rectangular shape, three or more through holes 2 can be arranged along each longer edge of the sheet-shaped hollow filtering element. Also, the sheet-shaped hollow filtering element can have a quadrangular shape as a whole, and through holes can be arranged at the four corners of the sheet-shaped hollow filtering element. In this configuration, a plurality of sheet-shaped hollow filtering elements can have the simplest structure, and can be held on the suction pipes at a plurality of positions along the outer peripheral part of the sheet-shaped hollow filtering elements.

Since the suction pipe 3 is inserted into the through hole 2, the interior shape of the through hole 2 is formed slightly larger than the exterior shape of the suction pipe 3. For example, through hole 2 can have an inner diameter 0.1 to 5 mm larger than the outer diameter of the suction pipe 3. In the case where the sheet-shaped hollow filtering element 1 accommodates the mesh material 12, the mesh material 12 also has through holes 2 so that the suction pipes 3 can be inserted into the through holes 2. The through holes 2 of the sheet-shaped hollow filtering element 1 can be formed by cutting the sheet-shaped hollow filtering element 1 with a cylindrical cutter. The through holes 2 can be formed by cutting the filtering materials 11 and the mesh material 12 with the cylindrical cutter.

Figure 12:
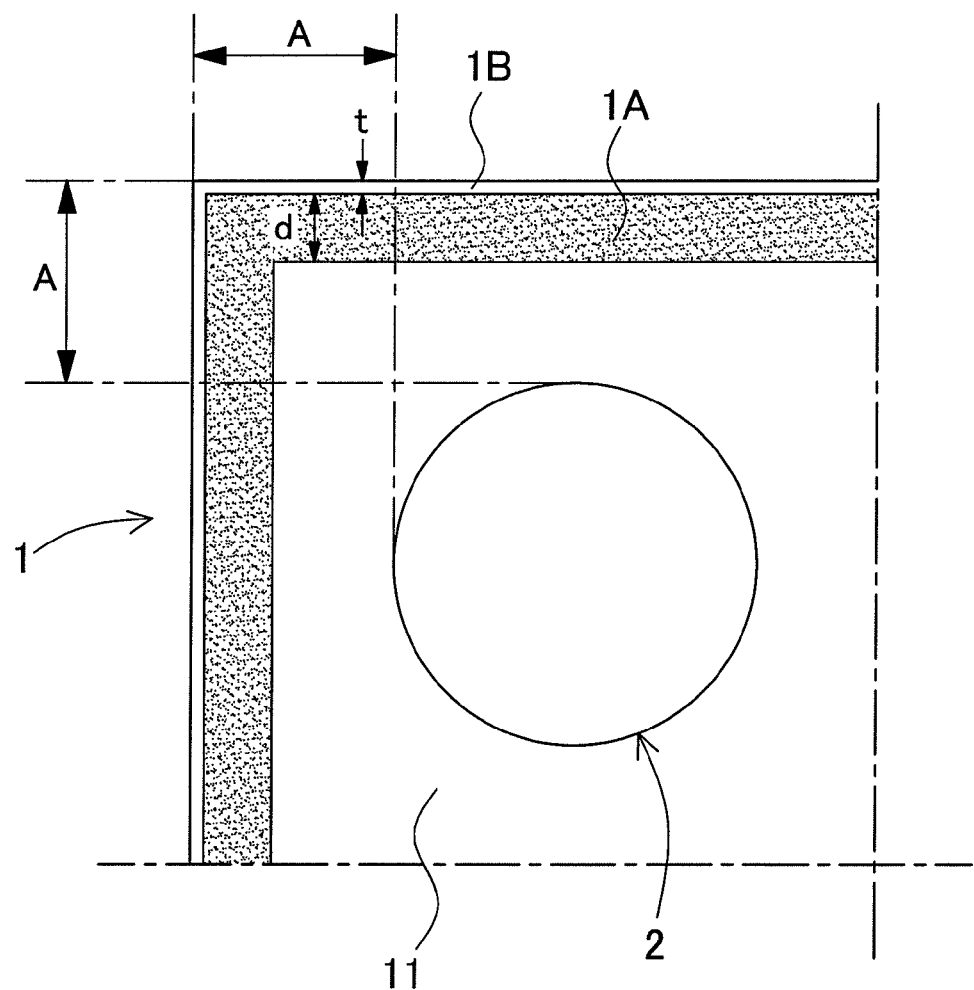
FIG. 12 is an enlarged front view showing a corner part of the sheet-shaped hollow filtering element.

As shown in FIGS. 11 and 12, the shortest distance (A) between the inner peripheral rim of the through hole 2 and the outer peripheral rim of the sheet-shaped hollow filtering element 1 is not more than 20% of the minimum width (W) of the sheet-shaped hollow filtering element 1, and is not more than 40 mm. In the illustrated sheet-shaped hollow filtering element 1, the minimum width (W) is 300 mm, and the shortest distance (A) between the inner peripheral rim of the through hole 2 and the outer peripheral rim of the sheet-shaped hollow filtering element 1 is 30 mm. In the case where the shortest distance (A) between the inner peripheral rim of the through hole 2 and the outer peripheral rim of the sheet-shaped hollow filtering element 1 is not more than 40 mm, preferably not more than 30 mm, the outer peripheral part of the sheet-shaped hollow filtering element can be reliably held by the suction pipe.

The suction pipe 3 is a plastic pipe made of hard plastic such as vinyl chloride resin. A plurality of through suction holes 4 are formed on the outer peripheral surface of the suction pipe 3. However, the suction pipe can be a plastic pipe made of a material other than the vinyl chloride resin, or a metal pipe such as stainless steel pipe. A plurality of slit-shaped suction holes 4 are formed extending in the axial direction on the outer peripheral surface of the suction pipe 3 shown in FIG. 9. The slit-shaped suction holes 4 are formed in parallel to each other and spaced at a predetermined interval away from each other in the radial direction on the entire peripheral surface of the suction pipe 3. Since the slit-shaped suction holes 4 are formed so as to extend in the axial direction on the outer peripheral surface of the suction pipe 3, the sheet-shaped hollow filtering elements 1 can be connected to the suction holes 4 even if deviated in the axial direction from their connection positions.

Figure 13:
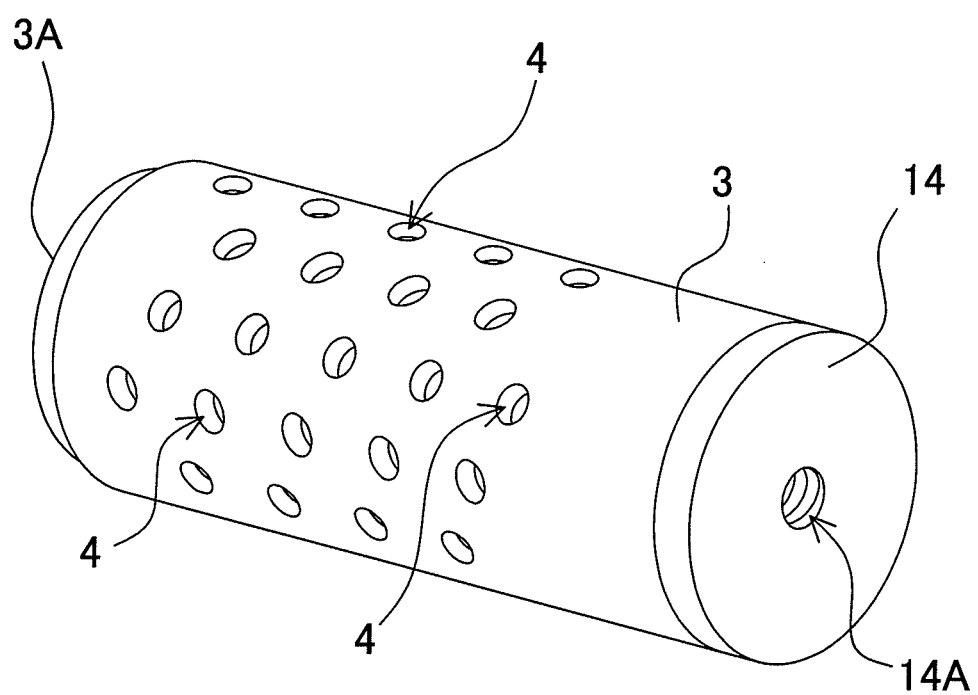
FIG. 13 is a perspective view showing an exemplary suction pipe.

The suction pipe does not necessarily have slit-shaped suction holes. For example, as shown in FIG. 13, the suction pipe can have a plurality of suction holes 4 that are spaced away from each other in the axial direction of the suction pipe. The plurality of suction holes 4 are formed on the entire outer peripheral surface of the suction pipe 3. Accordingly, the sheet-shaped hollow filtering elements 1 can be connected to any of the suction holes 4 even if deviated from their connection positions. In other words, although the plurality of suction holes 4 are spaced away from each other in the axial direction of the suction pipe, the suction holes 4 are arranged so as to be deviated from each other in the axial direction so that the suction holes 4 can be connected to a sheet-shaped hollow filtering element 1 that is arranged at any position.

Figure 14:
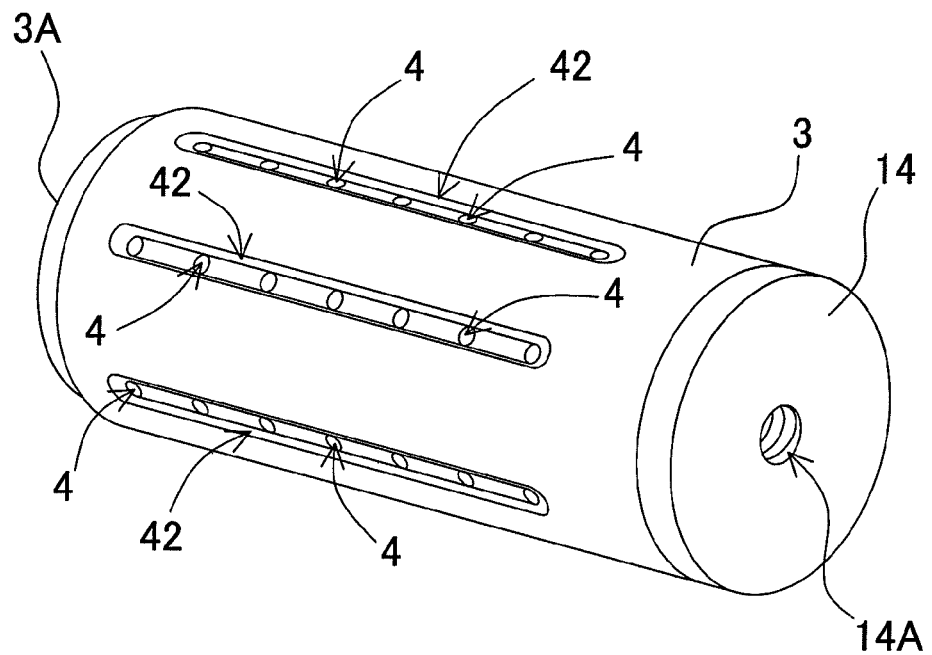
FIG. 14 is a perspective view showing another exemplary suction pipe.
Figure 15:
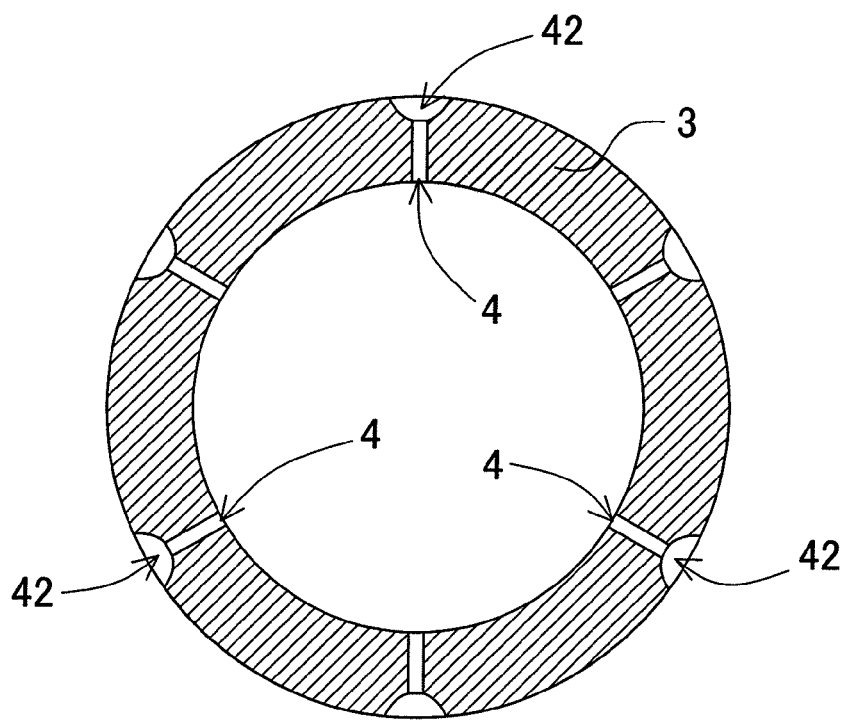
FIG. 15 is a transverse cross-sectional view of the suction pipe shown in FIG. 14.

Also, as shown in FIGS. 14 and 15, the suction pipe 3 can have a plurality of longitudinal grooves 42 that are formed so as to extend in parallel in the axial direction on the outer peripheral surface of the suction pipe 3. A plurality of through suction holes 4 can be formed on the bottom of each longitudinal groove 42 to be spaced away from each other in the axial direction. Also in this suction pipe 3, the sheet-shaped hollow filtering elements 1 can be connected to any of the suction holes 4 via the gap defined inside the longitudinal grooves 42 extending in the axial direction even if deviated from their connection positions.

Figure 16:
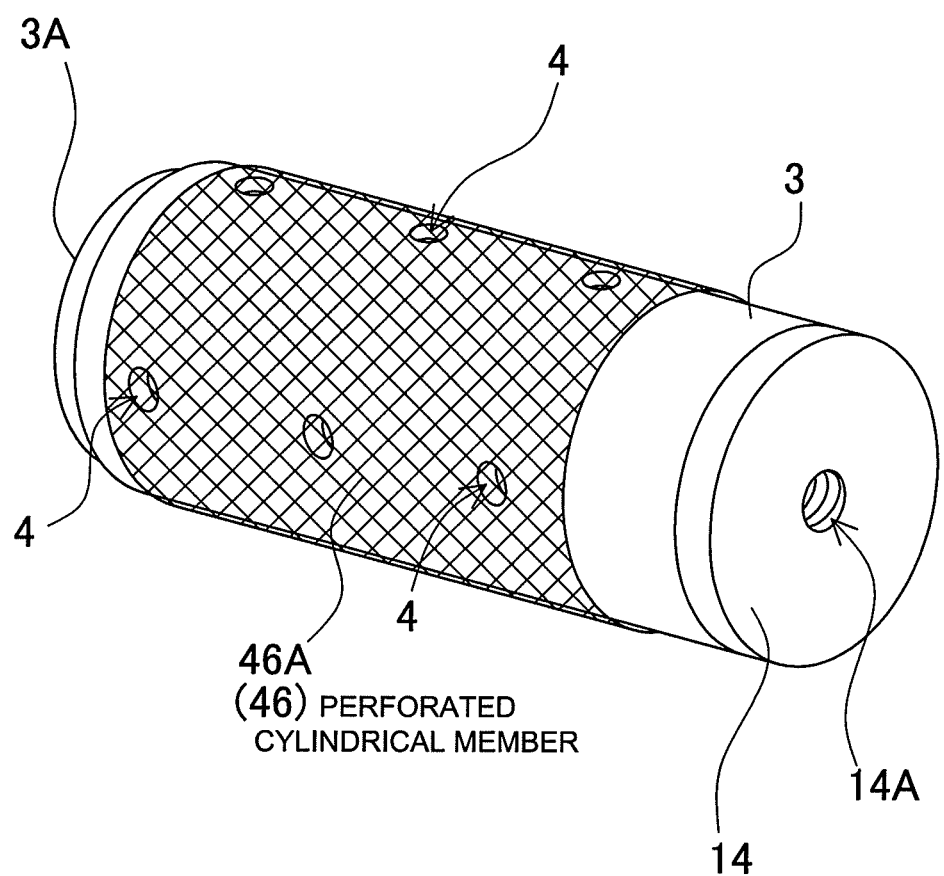
FIG. 16 is a perspective view showing another exemplary suction pipe.
Figure 17:
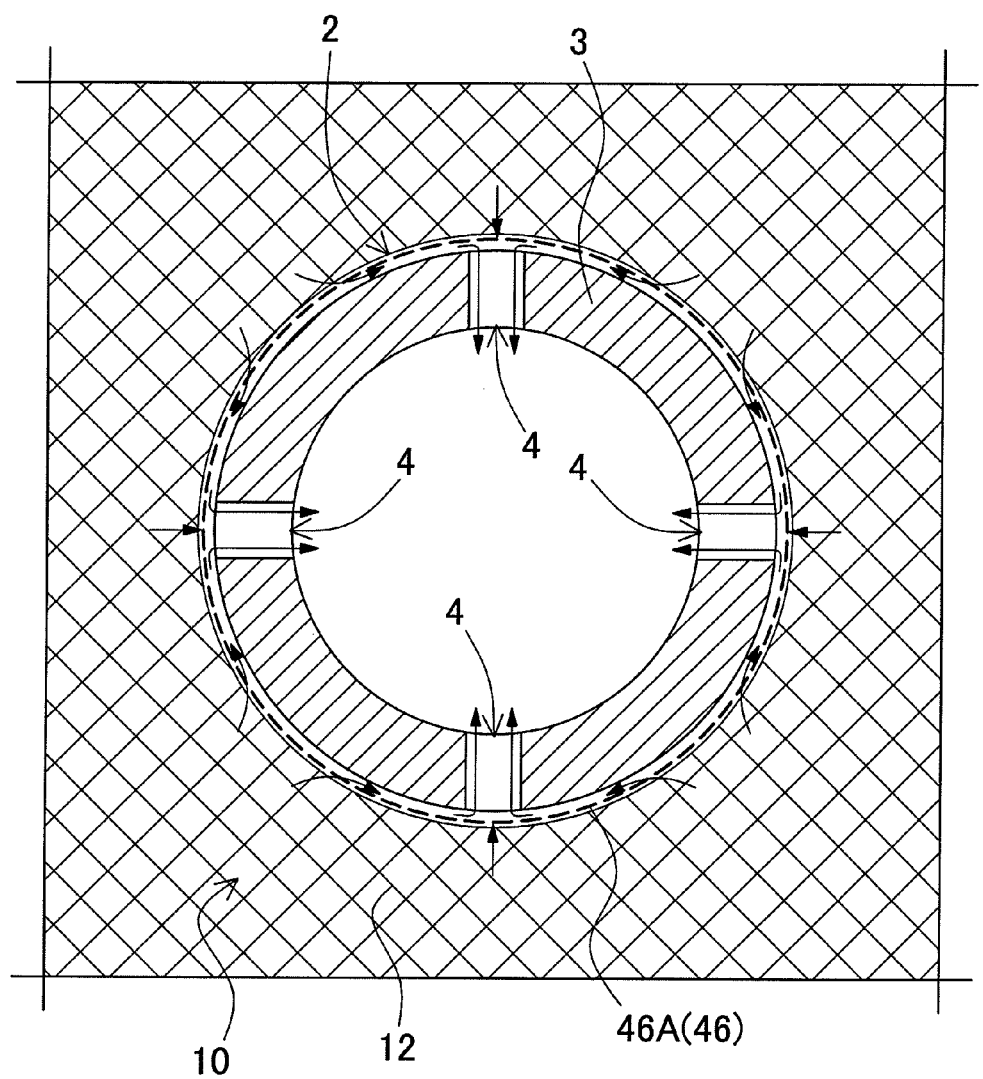
FIG. 17 is an enlarged transverse cross-sectional view showing the positional relationship between the suction pipe shown in FIG. 16 and through holes of the sheet-shaped hollow filtering element.

Also, a perforated cylindrical member 46 is laminated on the outer peripheral surface of a suction pipe 3 shown in FIGS. 16 and 17. The perforated cylindrical member 46 is a cylindrical member that has a number of through holes formed in the outer peripheral surface of the cylindrical member. The perforated cylindrical member 46 is laminated on the exterior side of a plurality of suction holes 4 that open on the outer peripheral surface of the suction pipe 3. The plurality of suction holes 4 are also formed at a predetermined constant interval over the outer peripheral surface of the illustrated suction pipe 3. The plurality of suction holes 4 formed in the outer peripheral surface of the suction pipe 3 are also formed so as to be deviated at a predetermined interval from each other in the axial direction. However, the suction pipe with the perforated cylindrical member laminated on its outer peripheral surface can have a plurality of suction holes that open at random positions in its outer peripheral surface, a plurality of slit-shaped through suction holes that extend in the axial direction, or a plurality of longitudinal grooves 42 that extend in parallel in the axial direction and have a plurality of through suction holes formed so as to be spaced away from each other on the bottom of each longitudinal groove 42.

The illustrated perforated cylindrical member 46 as the mesh material 46A is wound in a cylindrical shape on the outer peripheral surface of the suction pipe 3. The mesh material 46A can be made of metal or plastic. In the case of this perforated cylindrical member 46, since the sheet-shaped mesh material is wound on the outer peripheral surface of the suction pipe 3, the perforated cylindrical member 46 can be easily provided. However, the perforated cylindrical member can be a cylindrical member into which the suction pipe can be inserted. The cylindrical member has a number of through holes that open in the outer peripheral surface of the cylindrical member.

Figure 18:
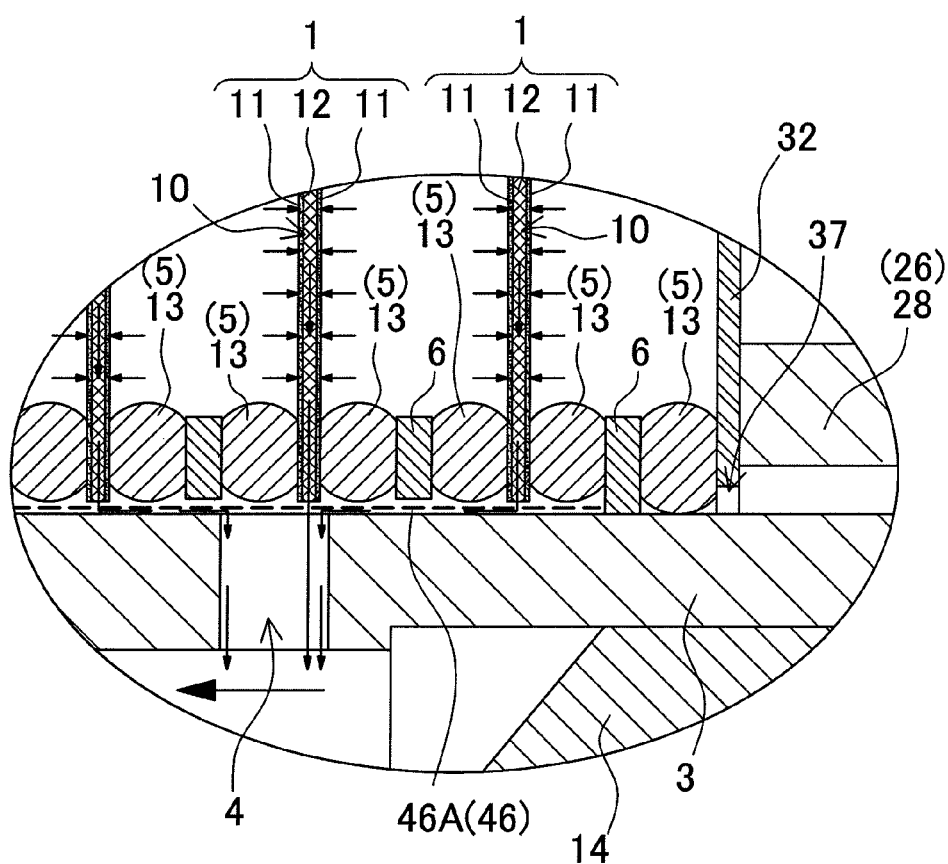
FIG. 18 is an enlarged cross-sectional view showing a principal part around the suction pipe shown in FIG. 16 with liquid being sucked into the suction pipe.

In the case where the perforated cylindrical member 46 is laminated on the outer peripheral surface of the suction pipe 3, as shown in FIGS. 17 and 18, when the suction pipe 3 with the perforated cylindrical member 46 is inserted into the through hole 2 of the sheet-shaped hollow filtering element 1, the suction holes 4 arranged on the suction pipe 3 can be connected to the hollow portion 10 of the sheet-shaped hollow filtering element 1 via the perforated cylindrical member 46. This filtering apparatus allows liquid to pass the hollow portion 10 of the sheet-shaped hollow filtering element 1 and then to the perforated cylindrical member 46 laminated on the outer peripheral surface of the suction pipe 3, and can suck the liquid into the suction holes 4 as shown by arrows in FIGS. 17 and 18. Thus, liquid can be efficiently sucked via substantially the entire inner peripheral surface of the through holes 2 formed in the sheet-shaped hollow filtering element 1. The liquid can efficiently move into the suction pipe 3 after passing the hollow portion 10 of the sheet-shaped hollow filtering element 1. In particular, according to this configuration, since the number of suction holes 4 can be reduced that open on the suction pipe 3, it is possible to simplify suction pipe machining but the liquid can efficiently be sucked into the suction pipe after passing the hollow portion 10 of the sheet-shaped hollow filtering element 1.

The suction pipes 3 are inserted into the through holes 2 of the sheet-shaped hollow filtering elements 1, and are connected to the sheet-shaped hollow filtering elements 1. In the filtering apparatuses shown in FIGS. 4 to 8, six suction pipes 3 are arranged in parallel to each other, and each of the suction pipes 3 is inserted into the through holes 2 of the sheet-shaped hollow filtering elements 1.

The sheet-shaped hollow filtering elements 1 are arranged side by side and are coupled to the suction pipe 3 in parallel to each other. In order that the sheet-shaped hollow filtering elements 1 can be spaced from each other, ring-shaped packing members 5 are arranged between the sheet-shaped hollow filtering elements 1. The suction pipe 3 is inserted into the ring-shaped packing member 5, which are interposed and held between the sheet-shaped hollow filtering elements 1. The ring-shaped packing member 5 has an interior shape capable of receiving the suction pipe 3, and an exterior shape larger than the interior shape of the through holes 2 of the sheet-shaped hollow filtering elements 1. The ring-shaped packing member 5 is interposed between the adjacent sheet-shaped hollow filtering elements 1, and water-tightly seals the clearance between the sheet-shaped hollow filtering element 1 and the suction pipe 3. In addition, the ring-shaped packing members 5 water-tightly close the suction holes 4 of the suction pipe 3 that open between the adjacent sheet-shaped hollow filtering elements 1.

Figure 9:
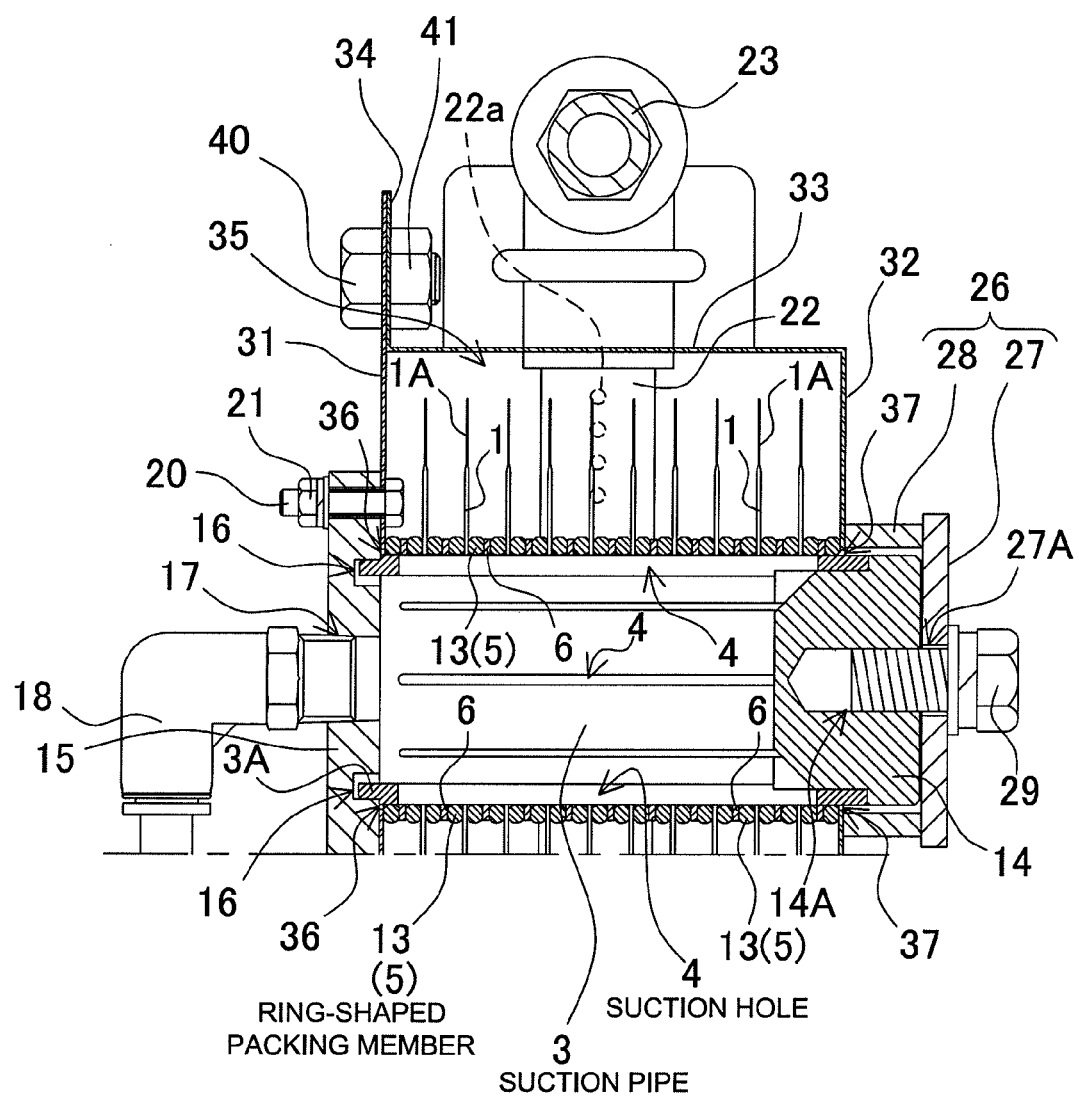
FIG. 9 is an enlarged cross-sectional view showing the filtering apparatus shown in FIG. 8.

In the filtering apparatus shown in FIGS. 9 and 10, O-rings 13 are used as the ring-shaped packing members 5. Each of the O-rings 13 is brought into intimate contact with the surface of the sheet-shaped hollow filtering element 1, and water-tightly seals the side surface of the sheet-shaped hollow filtering element 1. In addition, in the filtering apparatus shown in FIGS. 9 and 10, a plurality of ring-shaped packing members 5 are arranged between the adjacent sheet-shaped hollow filtering elements 1, and a ring-shaped spacer 6 is interposed between the ring-shaped packing members 5. The illustrated ring-shaped spacer 6 is made of resin. The O-rings 13 are in intimate contact with the both side surfaces of the spacer 6. However, the ring-shaped spacer can be a metal ring. The ring-shaped spacer 6 has a disk shape with a predetermined thickness. The inner diameter of the spacer 6 is substantially equal to the outer diameter of the suction pipe 3, and the outer diameter of the ring-shaped spacer 6 is substantially equal to the outer diameter of the O-ring 13. The O-rings 13 are in intimate contact with the flat side surfaces of the ring-shaped spacer 6. In the structure in which the ring-shaped spacer 6 is interposed between a pair of ring-shaped packing members 5, the ring-shaped packing members 5 are in intimate contact with opposite surfaces of the ring-shaped spacer 6. Accordingly, it is possible to provide more reliable water tight sealing. The interval between the adjacent sheet-shaped hollow filtering elements 1 can be adjusted by the thickness of the ring-shaped spacer 6. In other words, even in the case where the O-ring 13 has a circular shape in section and is in small in sectional diameter, the interval between the sheet-shaped hollow filtering elements 1 can be adjusted to an optimal value by the ring-shaped spacer 6.

Figure 19:
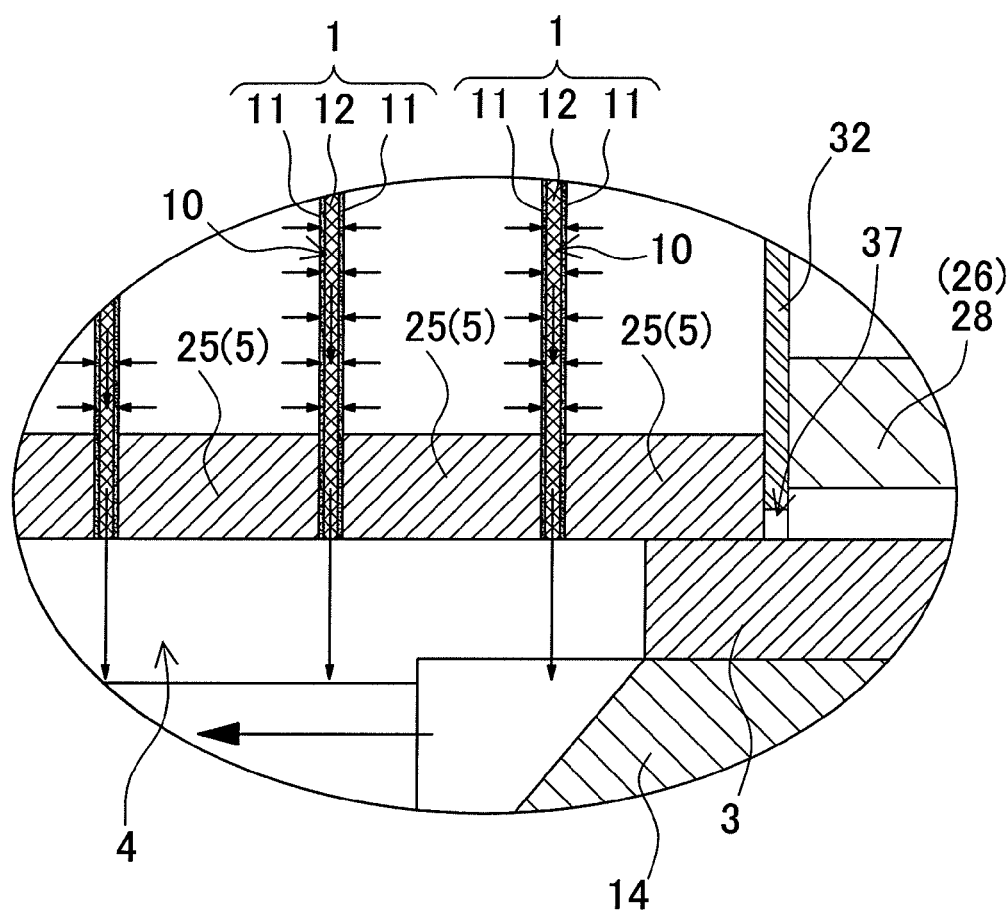
FIG. 19 is an enlarged cross-sectional view showing a principal part of a filtering apparatus according to another example of the present invention.
Figure 20:
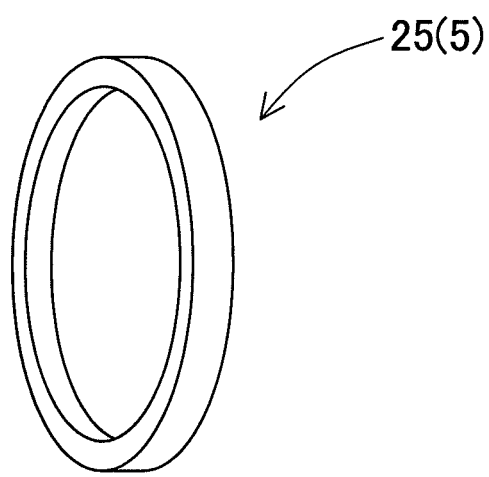
FIG. 20 is a perspective view showing a ring-shaped packing member of the filtering apparatus shown in FIG. 19.

Although the O-rings 13 are used as the ring-shaped packing members 5 in the filtering apparatus shown in FIGS. 9 and 10, O-rings are not necessarily used as the ring-shaped packing members. Any other members can be used that can be arranged between the adjacent sheet-shaped hollow filtering elements when receiving the suction pipe and can watertightly seal the side surface of the sheet-shaped hollow filtering element. In a filtering apparatus shown in FIG. 19, cylindrical rings 25 shown in FIG. 20 are used as the ring-shaped packing members 5. For example, the cylindrical ring 25 can be produced by cutting and dividing a cylindrical material made of rubber, silicon or the like with predetermined thickness into cylindrical rings with predetermined width. The end surfaces of the cylindrical ring 25 are brought into intimate contact with the side surfaces of the sheet-shaped hollow filtering element 1 thereby water-tightly sealing the side surfaces of the sheet-shaped hollow filtering element 1. The width of the cylindrical ring 25 is dimensioned to provide an optimal interval between the adjacent sheet-shaped hollow filtering elements 1. Thus, in the case where the cylindrical rings 25 are used as the ring-shaped packing members 5, the sheet-shaped hollow filtering elements 1 can be simply and easily arranged side by side in parallel to each other and can be arranged so as to be spaced at an optimal interval away from each other.

In the case where the interval between the sheet-shaped hollow filtering elements 1 is small, the number of sheet-shaped hollow filtering elements 1 can be increased. However, in the case where the interval between the sheet-shaped hollow filtering elements 1 is too small, the surfaces of the adjacent sheet-shaped hollow filtering elements 1 will be in contact with each other. In this case, liquid cannot be filtered by the entire surfaces of the sheet-shaped hollow filtering elements 1. For this reason, the interval between the sheet-shaped hollow filtering elements 1 is dimensioned to prevent intimate contact between the adjacent sheet-shaped hollow filtering elements 1 when liquid is sucked into the suction pipe 3. For example, the interval falls within a range of 5 to 10 mm. However, an optimal interval between the sheet-shaped hollow filtering elements depends on the thickness and the flexibility of the sheet-shaped hollow filtering element.

In the filtering apparatus shown in FIGS. 5 to 9, the sheet-shaped hollow filtering elements 1 are accommodated side by side in parallel to each other in an exterior case 30. The illustrated exterior case 30 includes a first metal plate 31, and a second metal plate 32 that is bent in a recessed shape. The first and second plates 31 and 32 are coupled to each other so that an accommodation portion 35 is defined that accommodates the sheet-shaped hollow filtering elements 1. Accordingly, the exterior case 30 including the first and second plates 31 and 32 has an exterior shape that is larger than the sheet-shaped hollow filtering element 1. The second plate 32 has side wall portions 33 that define the recessed shape. In the exterior case 30, the end parts of the side wall portions 33 arranged on the both sides of the second plate 32 are coupled to the side edge parts of the first plate 31. Thus, a box-shaped case is formed so that it opens upward and downward as the exterior case 30. The second plate 32 has bent portions 34 that are bent outward of the end parts of the side wall portion 33. The first and second plates 31 and 32 are coupled to each other by locking screws 40 and nuts 41. The locking screws 40 penetrate the bent portions 34 and both side edge parts of the first plate 31. The illustrated exterior case 30 has notch portions 38 on the lower ends of the first and second plates 31 and 32. Thus, gaps 39 are formed when the exterior case 30 is installed on the bottom of the tank 50. Although not illustrated, the exterior case can have supporting legs that are coupled to the lower end of the exterior case to hold the filtering apparatus in an upright posture to prevent the filtering apparatus from falling to the bottom of the tank. In the aforementioned exterior case 30, the first and second plates 31 and 32 are metal plates. However, one of or both of the first and second plates of the exterior case may be made of hard plastics such as vinyl chloride resin.

In addition, in the illustrated filtering apparatus, the first and second plates 31 and 32 are arranged on both ends of each of the suction pipes 3. The first and second plates 31 and 32 are coupled to each other by the suction pipes 3 so that the sheet-shaped hollow filtering elements 1 are interposed between the first and second plates 31 and 32 and are held side by side. In other words, in the illustrated filtering apparatus, the suction pipes 3 serve as coupling devices for coupling the first and second plates 31 and 32 to each other. As a result, the sheet-shaped hollow filtering elements 1 are interposed between the first and second plates 31 and 32 and are held side by side via the suction pipes 3 by the first and second plates 31 and 32 of the exterior case 30. In the exterior case 30, a plurality of insertion holes 36 and 37 are formed so as to be spaced away from each other in the vertical direction on both side parts of the first and second plates 31 and 32. The insertion holes 36 and 37 penetrate the first and second plates 31 and 32, respectively. The suction pipes 3 are inserted into the insertion holes 36 and 37. In the illustrated filtering apparatus, six suction pipes 3 are coupled to the sheet-shaped hollow filtering elements 1 arranged side by side. Correspondingly, six insertion holes 36 or 37 are formed in the first plate 31 or the second plate 32.

In the illustrated filtering apparatus, closing plates 15 are secured to the outer side surfaces of the insertion holes 36 of the first plate 31. The closing plate 15 has an exterior shape larger than the insertion hole 36. The insertion hole 36 on the first plate 31 is closed by the closing plate 15. The closing plate 15 is secured to the first plate 31 on the opening end of the insertion hole 36 by locking screws 20 and nuts 21. The locking screws 20 penetrate the first plate 31 and the closing plate 15. The nuts 21 are threadedly engage with the locking screws 20. The closing plate 15 has a circular positioning recessed portion 16 that is located inside (insertion hole side), and receives the end of the suction pipe 3. As shown in FIG. 9, one opening end of the suction pipe 3 is fitted in and secured to the positioning recessed portion 16 of the closing plate 15. The end of the suction pipe 3 to be inserted into the positioning recessed portion 16 has a stepped portion that has a smaller diameter part. The smaller diameter of a protruding part 3A is substantially equal to the inner diameter of the positioning recessed portion 16. Thus, protruding part 3A is secured in place. The closing plate 15 has a suction hole 17 that is located at the center of the positioning recessed portion 16 and opens to communicate with the suction pipe 3. A connection pipe 18 is inserted into the suction hole 17 of the closing plate 15 so that the pump 9 sucks out liquid inside the suction pipe 3.

Figure 7:
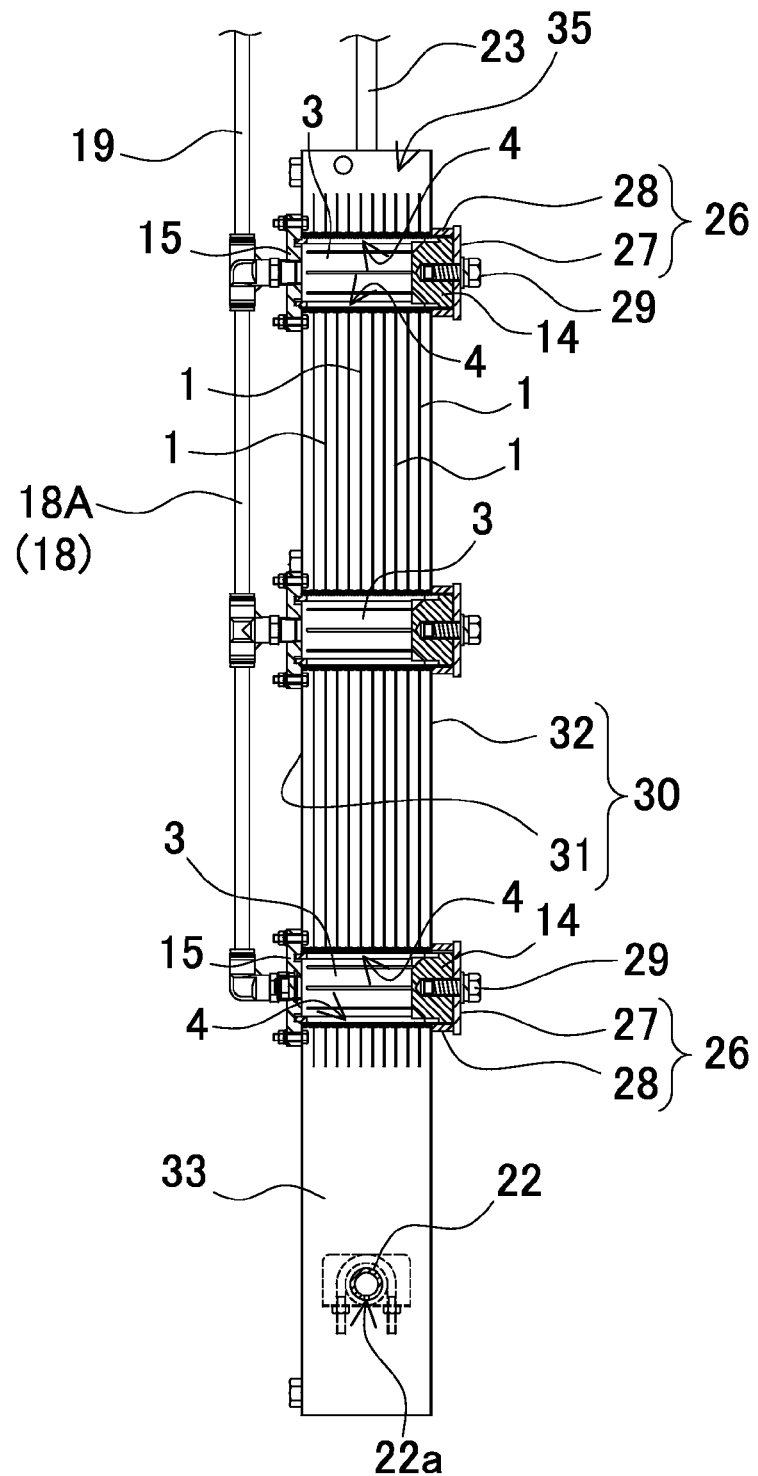
FIG. 7 is a cross-sectional view showing the filtering apparatus taken along a line VII-VII shown in FIG. 5.
Figure 8:
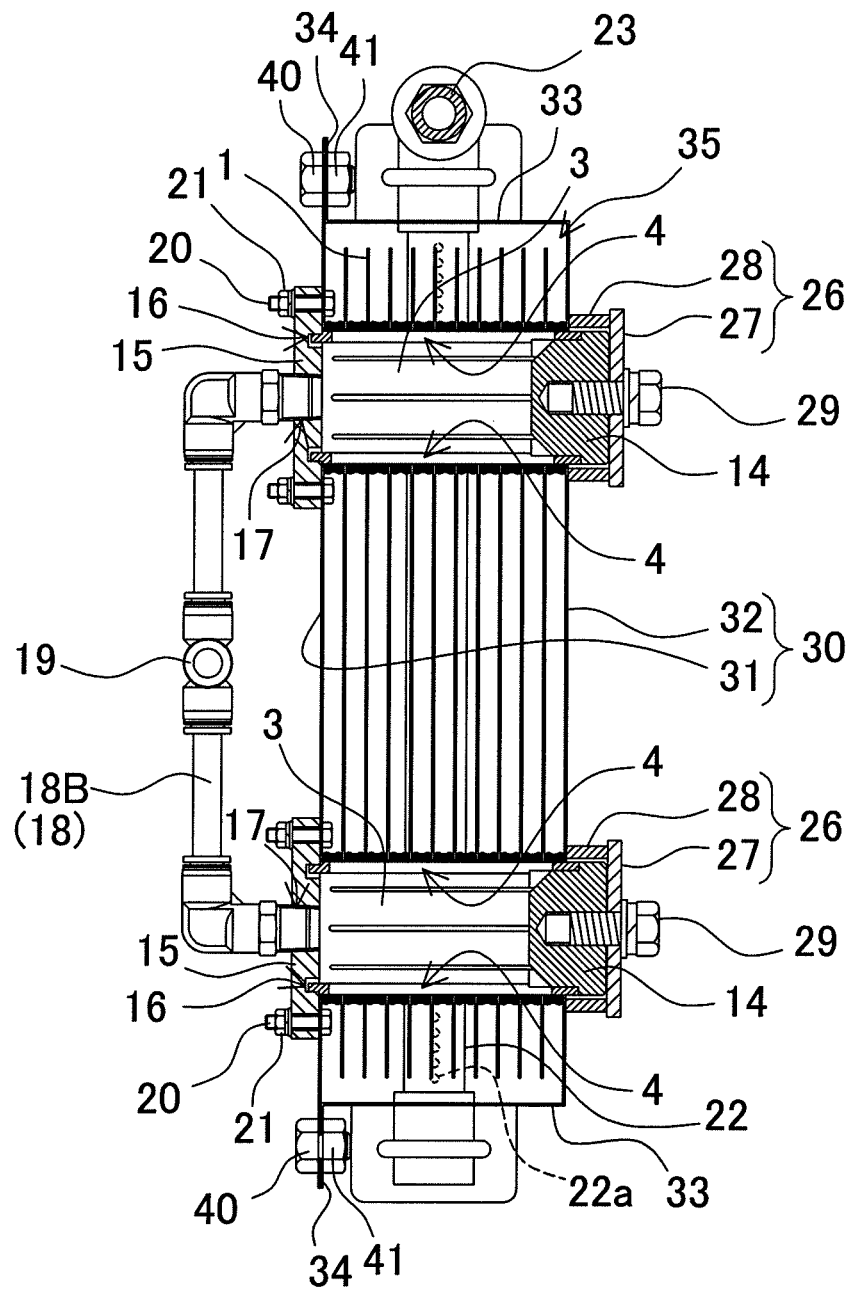
FIG. 8 is a cross-sectional view showing the filtering apparatus taken along a line VIII-VIII shown in FIG. 5.

As shown in FIGS. 7 to 9, the other opening end of the suction pipe 3 is closed by a closing portion 14. An end of the closing portion 14 protrudes externally of the insertion hole 37 of the second plate 32. This suction pipe 3 is coupled to the second plate 32 by an attachment member 26 that is coupled to the end of the closing portion 14 protruding from the second plate 32. An internal threaded opening 14A is formed on an end surface of the closing portion 14 of the suction pipe 3. The internal threaded opening 14A threadedly engages with a locking screw 29 to couple the attachment member 26 to the suction pipe 3. The attachment member 26 includes a circular support plate 27 that has an outer diameter that is larger than the outer diameter of the closing portion 14, and a thrusting ring 28 that is arranged between the outer peripheral rim of the support plate 27 and the second plate 32. The support plate 27 has an insertion hole 27A that opens at the center of the support plate 27. The locking screw 29 is inserted into the insertion hole 27A. The illustrated attachment member 26 has the thrusting ring 28 and the support plate 27 as separated member from each other, and the thrusting ring 28 is arranged on the outer peripheral rim of the support plate 27. However, the attachment member can have the thrusting ring and the support plate formed integrally with each other.

In the illustrated filtering apparatus, the locking screw 29 penetrates the support plate 27 and is screwed into the closing portion 14 of the suction pipe 3 to secure the support plate 27. The locking screw 29 thrusts the second plate 32 via the thrusting ring 28 by the support plate 27 secured to the suction pipe 3. Thus, the first and second plates 31 and 32 are secured and spaced at a predetermined interval away from each other. In order that the first and second plates 31 and 32 can be spaced at a certain interval so that the sheet-shaped hollow filtering elements 1 are arranged side by side and the ring-shaped packing member 5 is interposed between the sheet-shaped hollow filtering elements 1 with the sheet-shaped hollow filtering element 1 being in intimate contact with the ring-shaped packing member 5, the thrusting ring 28 is dimensioned to a predetermined thickness. In this configuration, in the case where the thrusting pressure ring 28 is made of a hard material, the first and second plates 31 and 32 can be coupled to each other so as to be spaced away at the predetermined interval from each other on all occasions. However, the thrusting ring can be formed of an elastic material such as elastic rubber material or coil spring. In this case, the first and second plates can be elastically thrust. In the thus-configured thrusting ring, the ring-shaped packing members and the sheet-shaped hollow filtering elements can be sandwiched at a certain thrusting force.

The suction pipe 3 is inserted into the sheet-shaped hollow filtering elements 1. The ring-shaped packing member 5, the ring-shaped spacer 6, and the ring-shaped packing member 5 are arranged side by side between the adjacent sheet-shaped hollow filtering elements 1. In the filtering apparatus shown in a cross-sectional view of FIG. 9, the ring-shaped packing members 5 and the ring-shaped spacer 6 are arranged side by side also on the outside of the sheet-shaped hollow filtering element 1 that is arranged in each outermost position. In other words, in FIG. 9, the ring-shaped packing member 5, the ring-shaped spacer 6, and the ring-shaped packing member 5 are arranged side by side on the outside of the sheet-shaped hollow filtering element 1 that is arranged on the rightmost side of the suction pipe 3. Also, in FIG. 9, the ring-shaped packing member 5, the ring-shaped spacer 6, and the ring-shaped packing member 5 are arranged side by side on the outside of the sheet-shaped hollow filtering element 1 that is arranged on the leftmost side of the suction pipe 3. Thus, the inside surfaces of the first and second plates 31 and 32 are water-tightly sealed. In the filtering apparatus shown in FIG. 19, the ring-shaped packing member 5 as the cylindrical ring 25 is arranged between the sheet-shaped hollow filtering elements 1 without the ring-shaped spacer. Also, in this filtering apparatus, the ring-shaped packing member 5 as the cylindrical ring 25 is arranged on the outside of the sheet-shaped hollow filtering element 1 that is arranged in each outermost position to water-tightly seal the inside surface of each of the first and second plates 31 and 32.

In the illustrated filtering apparatus, the connection pipe 18 is connected to the suction hole 17 of the closing plate 15. An extension pipe 19 is connected to the connection pipe 18. Thus, the suction pipe 3 is connected to the pump 9 via the connection pipe 18 and the extension pipe 19. The illustrated connection pipe 18 includes two branched pipe portions 18A, and a connection portion 18B. The branched pipe portion 18A is connected to three suction pipes 3 secured on each of the both sides of the exterior case 30. The connection portion 18B is connected to the two branched pipe portions 18A. The connection portion 18B of the connection pipe 18 is connected to the extension pipe 19. In this configuration, the pump 9 can suck liquid in six suction pipes 3 connected to each other via the connection pipe 18.

A bubbling pipe 22 is coupled to the bottom of the exterior case 30. The bubbling pipe 22 discharges bubbles toward the sheet-shaped hollow filtering elements 1. The bubbling pipe 22 has a number of small holes 22a. When supplied with pressurized air, the bubbling pipe 22 discharges air via the holes 22a to produce small bubbles in liquid. In the illustrated filtering apparatus, the bubbling pipe 22 extends in the horizontal direction in the width direction of the sheet-shaped hollow filtering element 1 in the bottom part of the exterior case 30. The bubbles discharged from the bubbling pipe 22 move upward along the surfaces of the sheet-shaped hollow filtering elements 1 arranged side by side. Thus, the bubbles can be efficiently supplied to the entire surface of each sheet-shaped hollow filtering element 1. However, the filtering apparatus can have a bubbling pipe that extends in the side-by-side arrangement direction of the sheet-shaped hollow filtering elements. In the filtering apparatus, a plurality of bubbling pipes can be arranged spaced away from each other in the width direction of the sheet-shaped hollow filtering element, for example. In this case, the bubbles can be efficiently supplied to the entire surfaces of the sheet-shaped hollow filtering elements arranged side by side. The bubbling pipe 22 is connected to an air supply 24 via a supply pipe 23, as shown in FIG. 4. The discharged bubbles can loosen foreign bodies that settle on the surfaces of the sheet-shaped hollow filtering elements 1.

In the aforementioned filtering apparatus, the first and second plates 31 and 32 are coupled by the suction pipes 3 to compose the exterior cases 30. The sheet-shaped hollow filtering elements 1 are arranged side by side and the ring-shaped packing members 5 are interposed between the sheet-shaped hollow filtering elements 1, and the first and second plates 31 and 32. However, the sheet-shaped hollow filtering elements are not necessarily interposed between the first and second plates in the filtering apparatus. In the filtering apparatus, the sheet-shaped hollow filtering elements can be directly sandwiched by the attachment member that is coupled to one end of or each of the ends of each suction pipe.

In the filtering apparatus shown in FIGS. 21 to 24, intermediate portions of a plurality of suction pipes 3 are connected to a suction portion 47. The sheet-shaped hollow filtering elements 1 are arranged side by side on the suction pipes 3 that protrude at both sides of the suction portion 47 so that the ring-shaped packing members 5 are interposed between the sheet-shaped hollow filtering elements 1. The suction portion 47 includes a plurality of connection blocks 48 and a connection pipe 18. The connection blocks 48 connect the suction pipes 3 to each other. The connection pipe 18 connects the connection blocks 48 to each other. The illustrated filtering apparatus includes six suction pipes 3. Correspondingly, the suction portion 47 includes six connection blocks 48 that face the six suction pipes 3. That is, three connection blocks 48 are arranged in the vertical direction on each side of the illustrated filtering apparatus. The connection blocks 48 are connected to each other by the connection pipe 18.

The connection block 48 has a through hole 48A that receives the suction pipe 3. The suction pipe 3 is inserted into the through hole 48A. The intermediate portion of the suction pipe 3 is secured to the connection block 48. In addition, the connection block 48 has connection holes 48B that receive the connection pipe 18. The connection holes 48B communicate with the though hole 48A that penetrates the connection block 48. Thus, as for liquid in the suction pipe 3 inserted into the through hole 48A, the liquid can be sucked into the connection pipe 18 via suction holes 43 of the suction pipes 3. Accordingly, the suction holes 43 are formed at positions of the suction pipe 3 that face the connection holes 48B. In the illustrated suction portion 47, three connection blocks 48 are arranged in the vertical direction on each side of the suction portion 47. The upper connection block 48 has the connection holes 48B that open toward a horizontal side and the bottom side. The middle connection block 48 has connection holes 48B that open toward the top and bottom sides. The lower connection block 48 has connection holes 48B that open toward the top side and a horizontal side. The connection pipe 18 is inserted into the connection holes 48B that open toward a horizontal side, and the top and bottom sides. Thus, the plurality of connection blocks 48 are integrally connected to each other.

The connection pipe 18 includes vertical connection pipes 18X, and horizontal connection pipes 18Y. The vertical connection pipe 18X connects the adjacent connection blocks 48 arranged in the vertical direction to each other. The horizontal connection pipe 18Y connects the adjacent connection blocks 48 arranged in the horizontal direction to each other. The ends of the vertical connection pipe 18X are inserted into and secured to the connection holes 48B of the connection blocks 48 that open toward the top and bottom sides. The ends of the horizontal connection pipe 18Y are inserted into and secured to the connection holes 48B of the connection blocks 48 that open toward horizontal sides. In addition, divided at the center into two parts is the horizontal connection pipe 18Y that is arranged on the top and extends in the horizontal direction. A branch block 49 is connected to the center of the horizontal connection pipe 18Y. The extension pipe 19 is connected to the branch block 49. The pump 9 is connected to the extension pipe 19. In order to connect the horizontal connection pipe 18 and the extension pipe 19 to each other whereby connecting them to each other, the branch block 49 has a vertical connection hole 49B that connects the extension pipe 19 to the horizontal connection holes 49A that receive the horizontal connection pipe 18Y. The horizontal connection holes 49A and the vertical connection hole 49B communicate with each other inside the branch block 49.

In the illustrated suction portion 47, support plates 44 are secured to both surfaces of each of the plurality of connection blocks 48 arranged in the vertical and horizontal directions. The support plate 44 can be a metal or plastic plate, for example. In this configuration, the plurality of connection blocks 48 and the branch block 49 can be more firmly and integrally connected to each other. However, the suction portion does not necessarily include the support plates on both surfaces. The suction portion can include plastic films on its both surfaces instead of the support plates.

Figure 21:
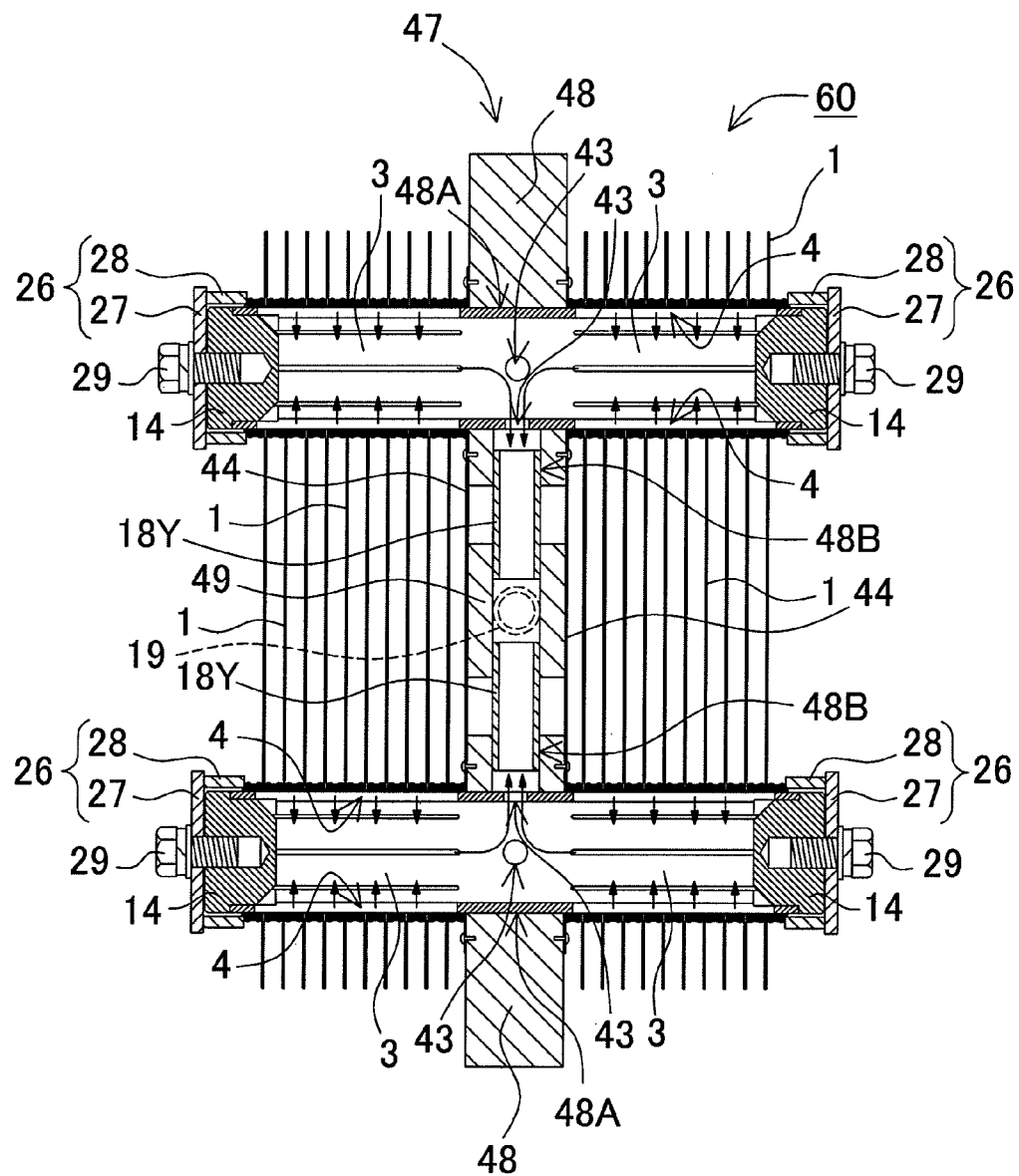
FIG. 21 is a horizontal cross-sectional view showing a filtering apparatus according to another example of the present invention.
Figure 22:
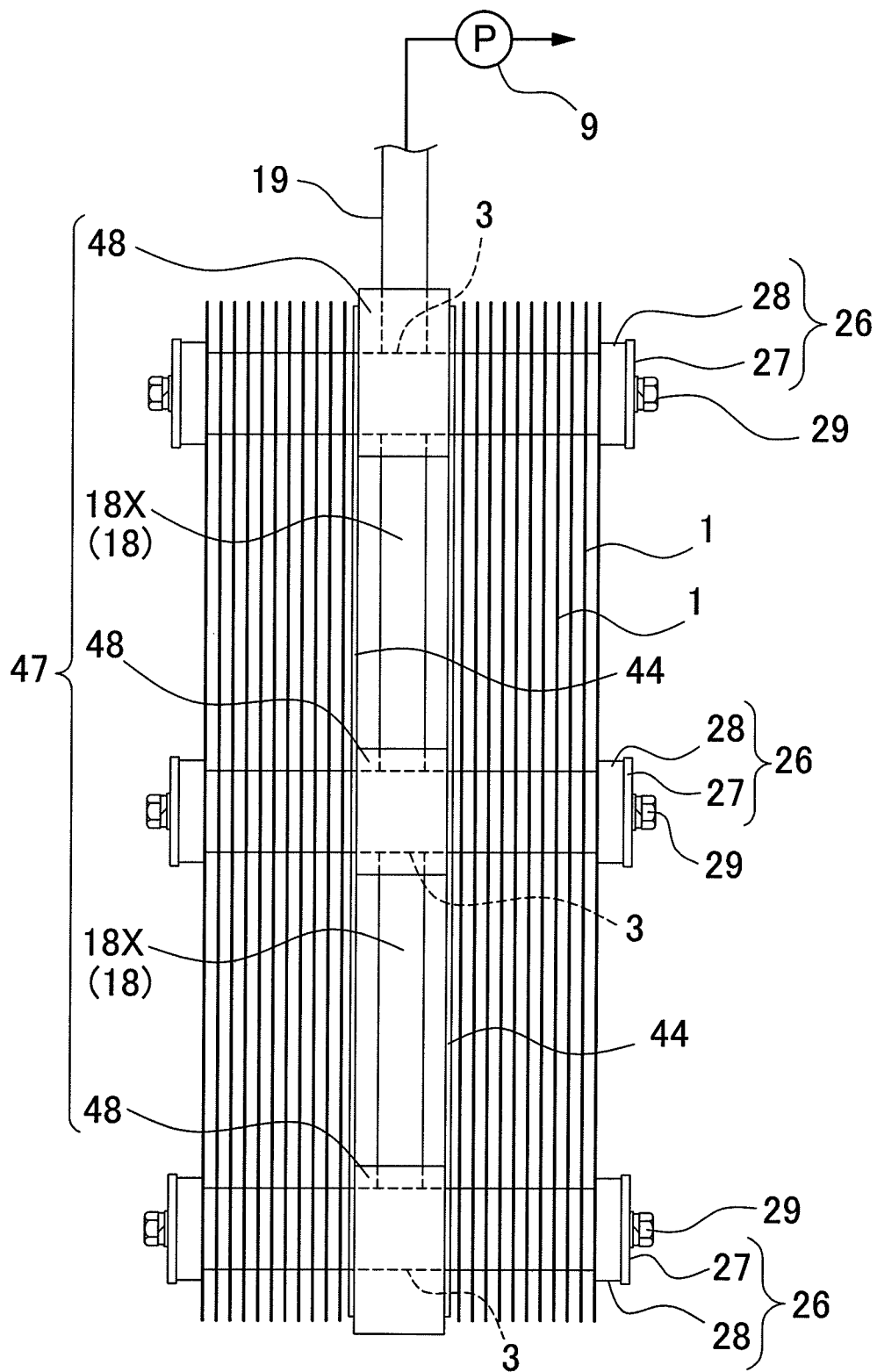
FIG. 22 is a side view of the filtering apparatus shown in FIG. 21.
Figure 23:
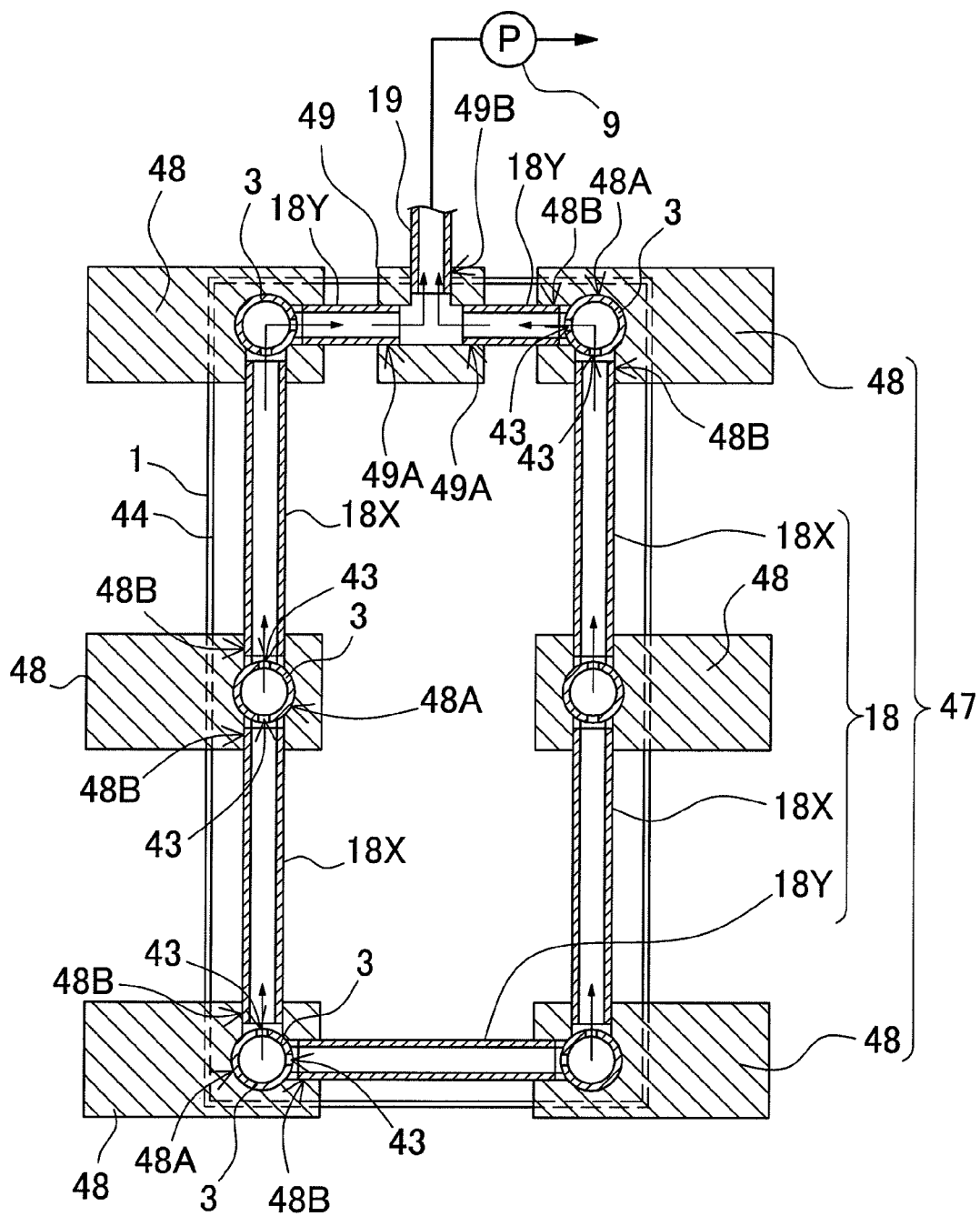
FIG. 23 is a vertical cross-sectional view of the filtering apparatus shown in FIG. 21.
Figure 24:
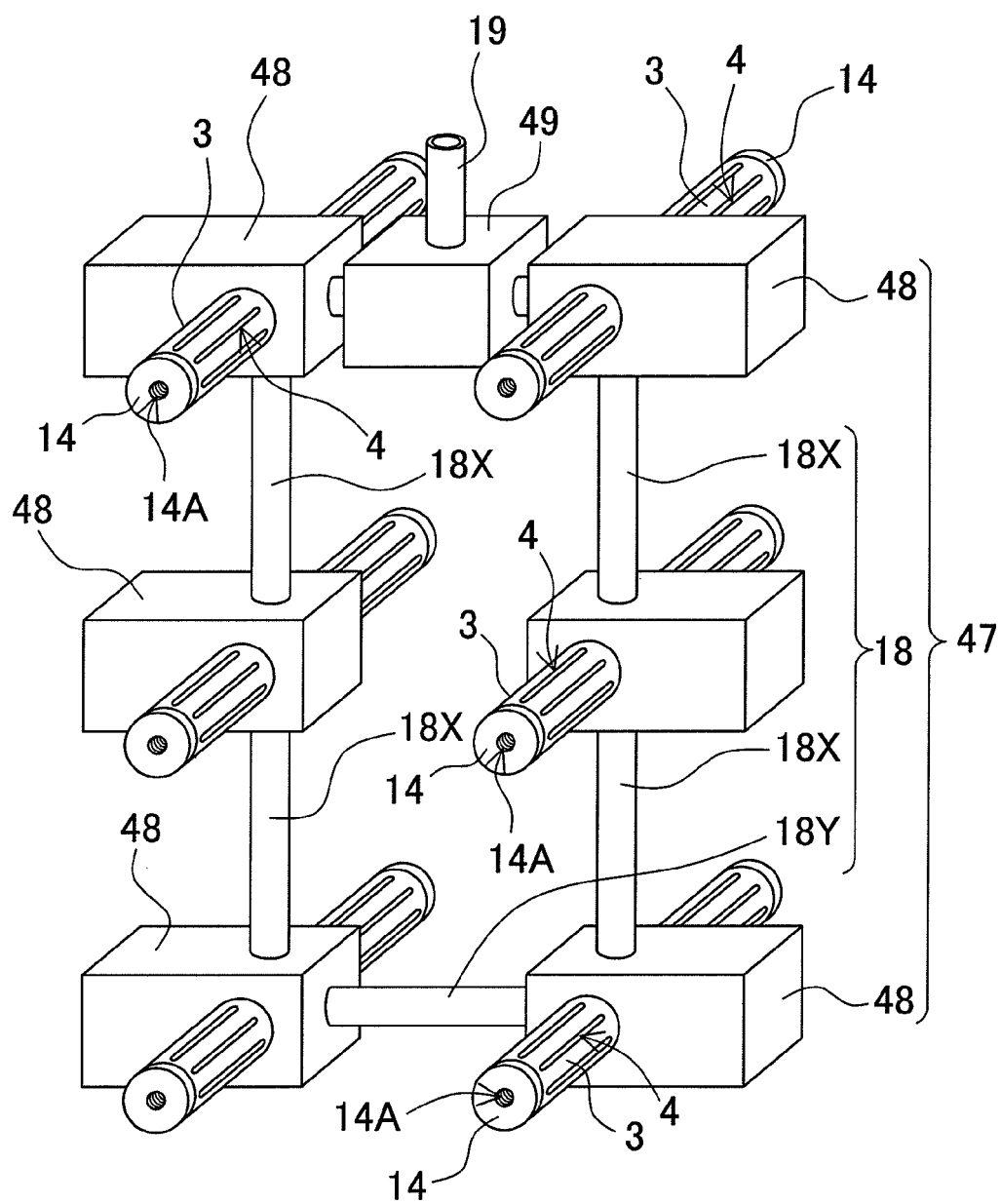
FIG. 24 is a perspective view schematically showing a suction portion of the filtering apparatus shown in FIG. 21, that is, the connection structure of connection blocks and the connection pipes.

In the suction portion 47, as shown in FIGS. 21 to 23, the suction pipes 3 protruding from both surfaces of the connection blocks 47 are inserted into the plurality of sheet-shaped hollow filtering elements 1 that are arranged side by side with the ring-shaped packing members 5 interposed between the sheet-shaped hollow filtering elements 1. The attachment members 26 are secured to the closing portions 14 on the end surfaces of the suction pipes 3 by the locking screws 29. The attachment member 26 is secured to the closing portion 14 by passing the locking screw 29 through the support plate 27 and threadedly engaging the locking screw 29 to the closing portion 14. Thus, the ring-shaped packing member 5 is directly thrust by the thrusting ring 28 by thrusting the support plate 27 secured to the suction pipe 3. However, a ring-shaped thrusting plate can be arranged between the attachment member and the ring-shaped packing member that is located on the outermost position of the suction pipe. The attachment member 26 secured to the end of the suction pipe 3 thrusts the ring-shaped packing member 5 that is located on the outermost position of the suction pipe to bring the plurality of sheet-shaped hollow filtering elements 1 arranged side by side into intimate contact with the ring-shaped packing members 5 that are interposed between the sheet-shaped hollow filtering elements 1.

In the thus-configured suction portion 47, a plurality of suction pipes 3 communicate with each other via the connection blocks 48 and the connection pipe 18. The connection pipe 18 is connected to the pump 9 via the branch block 49 and the extension pipe 19. In the filtering apparatus, the pump 9 can suck liquid in six suction pipes 3 connected to each other via the connection pipe 18 and the connection blocks 48. In this configuration, the sheet-shaped hollow filtering elements 1 are arranged side by side on both surfaces of the suction portion 47, and the pump 9 can solely suck liquid passing the sheet-shaped hollow filtering elements 1. Accordingly, the performance of the filtering apparatus can be improved.

In the filtering apparatus shown in FIGS. 21 to 24, one suction pipe 3 passes through the connection block 48. The sheet-shaped hollow filtering elements 1 are arranged side by side on protruding parts of the suction pipe 3 that protrude from both sides of the connection block 48. Liquid inside the suction pipe 3 is sucked via the connection pipe 18 connected to the center of the suction pipe 3. In this configuration, since the sheet-shaped hollow filtering elements 1 are arranged side by side on both sides of one suction pipe 3, the number of suction pipes can be reduced but a number of sheet-shaped hollow filtering elements 1 can be arranged side by side. However, in the filtering apparatus, the aforementioned pipes can be coupled and secured to the both surfaces of the connection block, that is, the suction pipe with an opening on its one end can be coupled and secured to both surfaces of the connection block. In this case, liquid in the suction pipes passes through holes and connection holes that open on the connection blocks. Thus, the liquid can be sucked via the connection pipe. In this filtering apparatus, the pump can suck liquid in twelve suction pipes coupled to both sides of the blocks.

Figure 25:
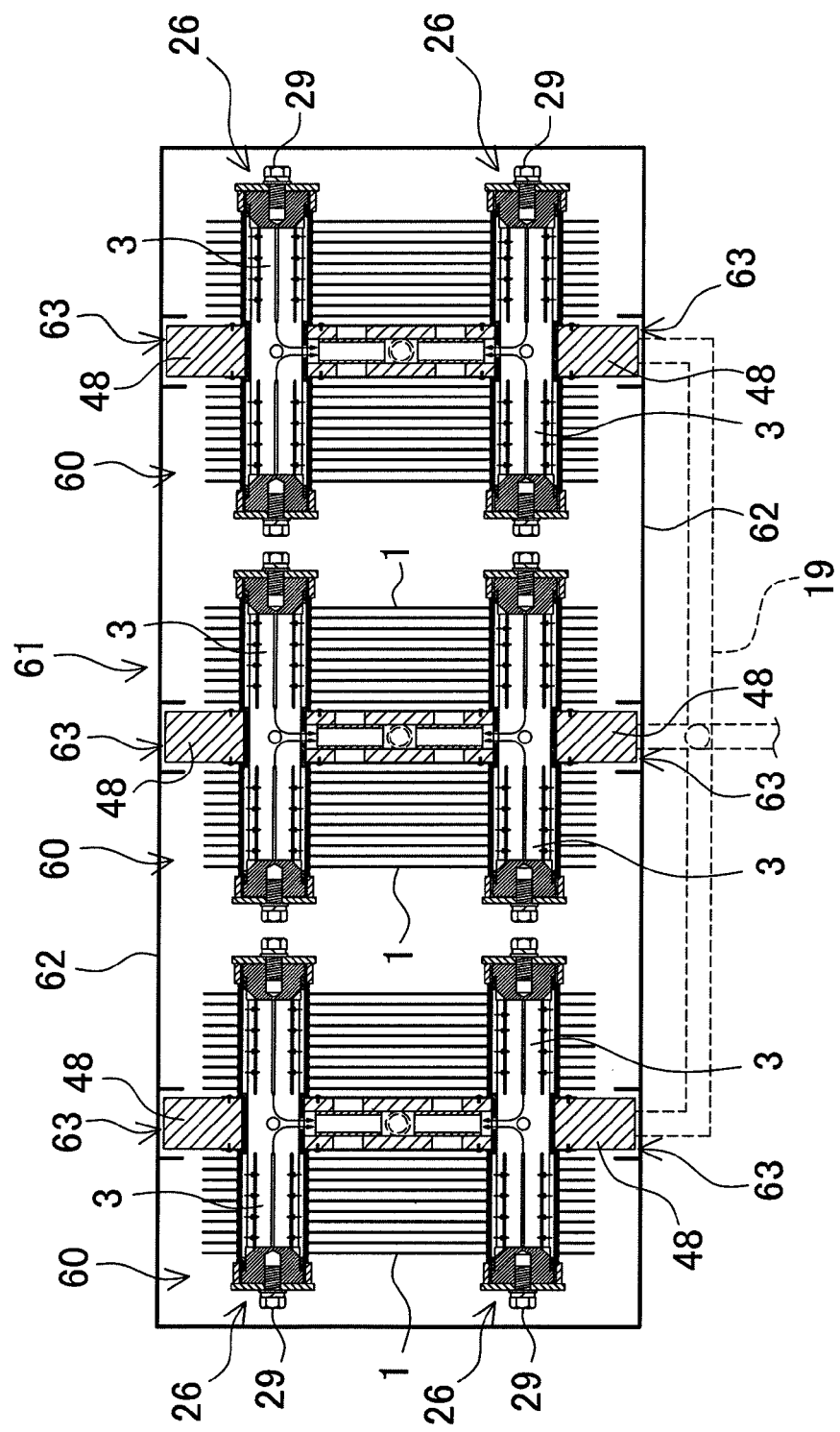
FIG. 25 is a cross-sectional view showing an exemplary connection of the filtering apparatuses shown in FIG. 22 in use.

In the filtering apparatus, as shown in FIG. 25, a filtering unit 60 can be composed of the sheet-shaped hollow filtering elements 1 that are arranged side by side on the both sides of the suction portion 47, and a plurality of filtering units 60 can be accommodated in an exterior case 61. This exterior case 61 has a length and a width that can accommodate the plurality of filtering units 60 in a plurality rows. The exterior case 61 shown in FIG. 25 accommodates three filtering units 60. The exterior case 61 has three sets of retainer grooves 63 on the interior surfaces of the side walls 62 that extend along longer edges. The retainer grooves 63 in each set are opposed to each other. The end parts of the suction portion 47 are fitted in the retainer grooves 63. That is, the retainer grooves 63 hold the outwardly protruding parts of the connection block 48 that are arranged on both ends. Thus, the filtering units 60 can be arranged in place in the exterior case 61. In the thus-configured filtering apparatus, the number of the accommodated filtering units 60 can be adjusted in accordance with installation places or applications, that is, demanded performance. Accordingly, this filtering apparatus can be installed in ideal conditions.

In a filtering apparatus according to the present invention, a plurality of sheet-shaped hollow filtering elements are arranged side by side in order to be spaced at a constant interval away from each other. Accordingly, the filtering area of the filtering apparatus can be increased. As a result, the filtering apparatus sucks liquid passing the sheet-shaped hollow filtering elements via suction pipes inserted into through holes arranged on the sheet-shaped hollow filtering elements thereby efficiently filtering turbid water and providing clear water.

The invention claimed is:

1. A filtering apparatus comprising:
a plurality of sheet-shaped hollow filtering elements each of which includes two sheets of laminated filtering materials with outer peripheral edge parts of the filtering materials being bonded to each other;
a plurality of suction pipes that penetrate said sheet-shaped hollow filtering elements to be connected to hollow portions inside of said sheet-shaped hollow filtering elements;
a plurality of packing members provided on said suction pipes, wherein, on each of said suction pipes, at least one of said packing members is interposed between said sheet-shaped hollow filtering elements that are adjacent to each other so as to space said sheet-shaped hollow filtering elements from each other, and thereby hollow space is defined between said adjacent sheet-shaped hollow filtering elements; and
a plurality of attachment members coupled to first ends of said suction pipes, respectively, so that said sheet-shaped hollow filtering elements are fixed in a stack,
wherein liquid passes the hollow portion inside said sheet-shaped hollow filtering element from the outside of said sheet-shaped hollow filtering element, and moves from the hollow portion of said sheet-shaped hollow filtering element to said suction pipes so that the liquid is filtered,
wherein each of said suction pipes forms suction holes to fluidly connect said suction pipes to the hollow portions of said sheet-shaped hollow filtering elements,
wherein said sheet-shaped hollow filtering elements form through holes that receive said suction pipes, and said suction pipes are inserted into the through holes so that said sheet-shaped hollow filtering elements are arranged side by side and are connected to said suction pipes,
wherein said packing members are interposed between said sheet-shaped hollow filtering elements that receive said suction pipes and are arranged side by side to watertightly seal clearances between said sheet-shaped hollow filtering elements and said suction pipes, and each of said packing members has an outer shape that is larger than the inner shape of the through holes of said sheet-shaped hollow filtering element,
wherein each of said attachment members includes a peripheral region that applies a force to said packing members disposed on the respective suction pipe to bring said sheet-shaped hollow filtering elements into contact with the packing members interposed between said sheet-shaped hollow filtering elements,
wherein the through holes are arranged at a plurality of locations along the outer peripheral part of each of said sheet-shaped hollow filtering elements, and said suction pipes are inserted into the through holes of each of said sheet-shaped hollow filtering elements so that each of said sheet-shaped hollow filtering elements is held at the plurality of outer peripheral locations to said suction pipes,
wherein each of said sheet-shaped hollow filtering elements has a quadrangular shape and the through holes are arranged at corners of said sheet-shaped hollow filtering element, each of said sheet-shaped hollow filtering elements having a pair of first sides which are opposed to each other and a pair of second sides which are opposed to each other, the first sides and the second sides being orthogonal to each other and each of the first sides being shorter than each of the second sides, and
wherein centers of the through holes of said sheet-shaped hollow filtering elements are located within a region that is less than a quarter (W/4) of a first side length (W) away from edges of the second sides, and
wherein the filtering apparatus further comprises a plurality of spacers provided on said suction pipes, wherein, on each of said suction pipes, each of said spacers is in intimate contact with the packing members at both side surfaces of each spacer such that said spacers and said packing members are in line along said suction pipes.

2. The filtering apparatus according to claim 1, wherein the shortest distance (A) between the inner peripheral rim of said through hole and the outer peripheral rim of said sheet-shaped hollow filtering element is not more than 20% of the minimum width (W) of said sheet-shaped hollow filtering element, and is not more than 40 mm.

3. The filtering apparatus according to claim 1, wherein each of said sheet-shaped hollow filtering elements has a rectangular shape, and three or more of the through holes are arranged along each of the second side thereof.

4. The filtering apparatus according to claim 1, wherein the suction holes of said suction pipes are slit-shaped through holes extending in the axial direction of said suction pipe.

5. The filtering apparatus according to claim 1, wherein each of said suction pipes includes a perforated cylindrical member that is laminated on the outer peripheral surface of said suction pipe, and each of said suction pipes with the laminated perforated cylindrical member is inserted into the through holes of said sheet-shaped hollow filtering elements so that the suction holes arranged on said suction pipes are connected to the hollow portions of said sheet-shaped hollow filtering elements via the perforated cylindrical member.

6. The filtering apparatus according to claim 1, wherein the outer peripheral edge parts of the two sheets of laminated filtering materials with a predetermined width are bonded to each other by melting or adhesion so that the hollow portions are formed in said sheet-shaped hollow filtering elements, and non-bonded portions are formed along the outer peripheral edges of the two sheets of filtering materials, and wherein the outer peripheral edges of the two sheets of filtering materials are not bonded to each other by melting or adhesion in the non-bonded portions.

7. The filtering apparatus according to claim 1, wherein each of said sheet-shaped hollow filtering elements includes a mesh material that is interposed between the two sheets of filtering materials to form the hollow portion inside said sheet-shaped hollow filtering element.

8. The filtering apparatus according to claim 1, wherein the first ends of said suction pipes, which said attachment members are attached to, are closed.

9. A filtering apparatus comprising:
a plurality of sheet-shaped hollow filtering elements arranged side-by-side to form a stack, each of said sheet-shaped hollow filtering elements including two sheets of laminated filtering materials, wherein outer peripheral edge parts of the sheet-shaped hollow filtering materials are bonded to each other;
a plurality of suction pipes penetrating said sheet-shaped hollow filtering elements so as to be connected to hollow portions inside of said sheet-shaped hollow filtering elements, said suction pipes being arranged in parallel so that said sheet-shaped hollow filtering elements are held by said suction pipes at a plurality of outer peripheral locations,
wherein each of said suction pipes forms suction holes to fluidly connect said suction pipes to the hollow portions of said sheet-shaped hollow filtering elements;
a plurality of packing members provided on said suction pipes, wherein, on each of said suction pipes, at least one of said packing members is interposed between said sheet-shaped hollow filtering elements that are adjacent to each other so as to space said sheet-shaped hollow filtering elements from each other, and thereby hollow space is defined between said sheet-shaped hollow filtering elements disposed adjacent to each other, and said packing members seal clearances between said sheet-shaped hollow filtering elements and said suction pipes; and
a plurality of attachment members coupled to first ends of said suction pipes, respectively, so that said sheet-shaped hollow filtering elements are fixed in a stack, said attachment members being positioned on a first side of the stack of sheet-shaped hollow filtering elements,
wherein each of said attachment members includes a peripheral portion that is aligned with and applies a compressive force to said packing members disposed on the respective suction pipe to hold said sheet-shaped hollow filtering elements in contact with the packing members,
wherein the filtering apparatus further comprises a plurality of spacers provided on said suction pipes, wherein, on each of said suction pipes, each of said spacers is in intimate contact with said packing members at both side surfaces of each spacer in the hollow space between said sheet-shaped hollow filtering elements that are adjacent to each other so that said spacers and said packing members are in line along said suction pipes.

10. The filtering apparatus according to claim 9, further comprising a plurality of closing portions inserted in the first ends of said suction pipes, respectively,
wherein each of said attachment members comprises:
a thrusting portion aligned with said packing member on an outermost position of said respective suction pipe; and
a support plate located outside of the thrusting portion and covering the closing portion; and
wherein the attachment members are secured to the closing portions at the first ends of said suction pipes with the thrusting portions being interposed between the support plates and the packing members on the outermost positions of the suction pipes, respectively.

11. The filtering apparatus according to claim 10, wherein the thrusting portions directly contact said packing members on an outermost position of said suction pipes.

12. The filtering apparatus according to claim 9, further comprising an exterior case having a first plate positioned at a second side of the stack of sheet-shaped hollow filtering elements, and a second plate positioned at the first side of the stack of sheet-shaped hollow filtering elements,
the stack of sheet-shaped hollow filtering elements being interposed between said first and second plates,
wherein said first and second plates are coupled together by said suction pipes, and
said peripheral portions apply a force to said packing members on the outermost positions of the suction pipes via said second plate.

13. The filtering apparatus according to claim 10, further comprising locking members coupling said attachment members to the closing portions on the first ends of said suction pipes, respectively,
wherein each of the locking members has a first end portion that is engaged with the support plate, and a second end portion that is opposite to the first end portion, the second end portion being embedded in said respective closing member.

14. The filtering apparatus according to Claim 12, wherein the first plate is substantially parallel to the second side of the stack of sheet shaped hollow filtering elements, and the second plate is substantially parallel to the first side of the stack of sheet shaped hollow filtering elements,
wherein each of said first plate and said second plate has a plurality of insertion holes corresponding to said suction pipes which are inserted into the insertion holes of the first plate and the second plate, and
wherein both ends of said suction pipes are fixed to said first and second plates at positions corresponding to the insertion holes of said first and second plates.

15. The filtering apparatus according to claim 9, wherein said suction pipes are integrally formed with said closing portions, respectively.

16. The filtering apparatus according to Claim 1, further comprising a suction portion to which intermediate portions of said suction pipes are connected.

17. A filtering apparatus comprising:
a plurality of sheet-shaped hollow filtering elements arranged side-by-side to form a stack, each of said sheet-shaped hollow filtering elements including two sheets of laminated filtering materials, wherein outer peripheral edge parts of the sheet-shaped hollow filtering materials are bonded to each other;
a plurality of suction pipes penetrating said sheet-shaped hollow filtering elements so as to be connected to hollow portions inside of said sheet-shaped hollow filtering elements, said suction pipes being arranged in parallel so that said sheet-shaped hollow filtering elements are held by said suction pipes at a plurality of outer peripheral locations,
wherein each of said suction pipes forms suction holes to fluidly connect said suction pipes to the hollow portions of said sheet-shaped hollow filtering elements;
a plurality of packing members provided on said suction pipes, wherein, on each of said suction pipes, at least one of said packing members is interposed between said sheet-shaped hollow filtering elements that are adjacent to each other so as to space said sheet-shaped hollow filtering elements from each other and seal clearances between said sheet-shaped hollow filtering elements and said suction pipes; and a plurality of attachment members coupled to first ends of said suction pipes, respectively, so that said sheet-shaped hollow filtering elements are fixed in a stack, said attachment members being positioned on a first side of the stack of sheet-shaped hollow filtering elements, wherein each of said attachment members includes a peripheral portion that is aligned with and applies a compressive force to said packing members disposed on the respective suction pipe to hold said sheet-shaped hollow filtering elements in contact with the packing members, wherein the filtering apparatus further comprises: an exterior case having a first plate positioned at a second side of the stack of sheet-shaped hollow filtering elements; and a second plate positioned at the first side of the stack of sheet-shaped hollow filtering elements, the stack of sheet-shaped hollow filtering elements being interposed between said first and second plates, wherein said first and second plates are coupled together by said suction pipes, wherein said peripheral portions apply a force to said packing members on the outermost positions of the suction pipes via said second plate, wherein the second plate has a protruding portion that extends outwardly at a bottom side of the second plate to form a notch portion that is surrounded by the protruding portion, and wherein the sheet-shaped hollow filtering elements are located above the notch portion away from the protruding portion of the second plate.

* * * * *